United States Patent
Adachi et al.

(10) Patent No.: US 7,277,729 B2
(45) Date of Patent: *Oct. 2, 2007

(54) BASE STATION APPARATUS AND TERMINAL APPARATUS

(75) Inventors: Tomoko Adachi, Urayasu (JP); Kiyoshi Toshimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/172,946

(22) Filed: Jul. 5, 2005

(65) Prior Publication Data

US 2005/0245237 A1    Nov. 3, 2005

Related U.S. Application Data

(63) Continuation of application No. 10/242,632, filed on Sep. 13, 2002, now Pat. No. 6,947,768.

(30) Foreign Application Priority Data

Sep. 28, 2001    (JP)    ............................ 2001-304700

(51) Int. Cl.
*H04B 1/38* (2006.01)
*H04M 1/00* (2006.01)

(52) U.S. Cl. ................ 455/561; 455/412.1; 455/414.1; 455/420; 455/435.1; 455/447; 455/448; 455/449; 455/450; 455/453; 455/456.5; 455/560; 370/349; 370/370; 370/371

(58) Field of Classification Search ................ 455/561, 455/26.1, 560, 412.1, 414.1, 420, 435.1, 455/447, 448, 449, 453, 456.5, 450; 370/349, 370/370, 371

See application file for complete search history.

(56) References Cited

U.S. PATENT DOCUMENTS

| 5,613,211 | A  |     | 3/1997  | Matsuno |
| 5,848,064 | A  |     | 12/1998 | Cowan |
| 6,215,982 | B1 |     | 4/2001  | Trompower |
| 6,233,466 | B1 |     | 5/2001  | Wong et al. |
| 6,622,019 | B1 |     | 9/2003  | Shalem et al. |
| 6,668,174 | B1 | *   | 12/2003 | Struhsaker et al. ......... 455/450 |

(Continued)

FOREIGN PATENT DOCUMENTS

EP    0 698 976    2/1996

(Continued)

*Primary Examiner*—Matthew D. Anderson
*Assistant Examiner*—Shaima Q. Aminzay
(74) *Attorney, Agent, or Firm*—Oblon, Spivak, McClelland, Maier & Neustadt, P.C.

(57) ABSTRACT

A base station apparatus corresponding to a first base station apparatus of base station apparatuses and connected to terminal apparatuses, first base station apparatus transmitting and receiving first packets with respect to a second base station apparatus corresponding to another of base station apparatuses and transmitting and receiving second packets with respect to terminal apparatuses, first base station apparatus transmits a third packet to second base station apparatus, third packet corresponding to one of first packets to be transmitted from first base station apparatus and including a first data item, second base station apparatus recognizing by first data item that first base station apparatus is one of base station apparatuses, third packet being used through an authentication process or an association process for connecting in wireless first base station apparatus to second base station apparatus.

44 Claims, 20 Drawing Sheets

U.S. PATENT DOCUMENTS

| | | |
|---|---|---|
| 6,711,403 B1 | 3/2004 | Herrmann et al. |
| 6,795,409 B1 * | 9/2004 | Youssefmir et al. ........ 370/328 |
| 6,983,167 B2 | 1/2006 | Adachi et al. |
| 2001/0041494 A1 | 11/2001 | Barad et al. |
| 2002/0028656 A1 * | 3/2002 | Yemini et al. ................. 455/41 |
| 2002/0136170 A1 * | 9/2002 | Struhsaker .................. 370/280 |
| 2005/0245237 A1 | 11/2005 | Adachi et al. |

FOREIGN PATENT DOCUMENTS

| | | |
|---|---|---|
| EP | 0 964 591 | 12/1999 |
| EP | 1 124 397 | 8/2001 |
| WO | WO98/01002 | 1/1998 |

\* cited by examiner

FIG. 7A
| BSSID | Terminal |
|---|---|
| AP1 | STA11<br>STA12 |
FIG. 7B
| BSSID | Terminal |
|---|---|
| AP2 | STA21<br>STA22 |
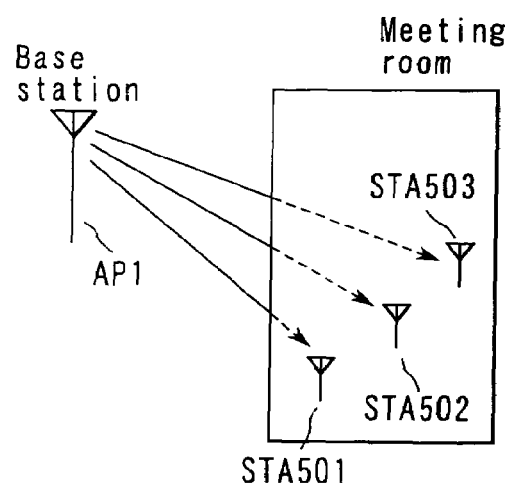
FIG. 8A
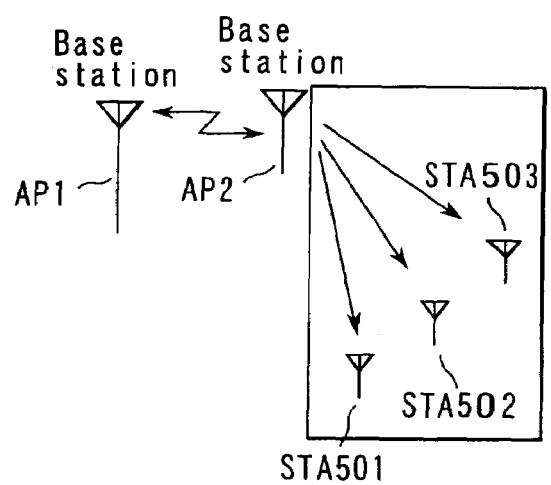
FIG. 8B

| | To DS | Frame DS Address | Address 1 | Address 2 | Address 3 | Address 4 |
|---|---|---|---|---|---|---|
| S354 Frame to be transmitted from terminal STA21 to base station AP2 | 1 | 0 | BSSID=AP2 | SA=STA21 | DA=STA11 | None |
| S355 Frame to be transmitted from base station AP2 to base station AP1 | 1 | 1 | RA=AP1 | TA=AP2 | DA=STA11 | DA=STA21 |
| S356 Frame to be transmitted from base station AP1 to terminal STA11 | 0 | 1 | DA=STA11 | BSSID=AP1 | SA=STA21 | None |
| Frame to be exchanged between terminals in single BSS | 0 | 0 | DA | SA | BSSID | None |

FIG. 9

BASE STATION APPARATUS AND TERMINAL APPARATUS

CROSS-REFERENCE TO RELATED APPLICATIONS

This application is a continuation of U.S. patent application Ser. No. 10/242,632, filed Sep. 13, 2002 now U.S. Pat. No. 6,947,768, which is based upon and claims the benefit of priority from the prior Japanese Patent Application No. 2001-304700, filed Sep. 28, 2001, the entire contents of each of which are incorporated herein by reference.

BACKGROUND OF THE INVENTION

1. Field of the Invention

The present invention relates to a communication system which is comprised by a plurality of base stations and a plurality of terminals, each of the terminals being connected to one of the base stations. More specifically, the invention relates to techniques for connecting base stations wirelessly, without being influenced by a communication between a base station and a terminal, and without influencing it.

2. Description of the Related Art

As a wireless LAN, a wireless LAN system based on IEEE802.11 (ISO/IEC8802-11:1999(E) ANSI/IEEE Std 802.11, 1999 edition) is known. As one form of such wireless LAN system, an element called a Basic Service Set (BSS) in which a base station covers a plurality of terminals is used, and a plurality of BSSs form a network. A structural element that connects neighboring BSSs is called a Distribution System (DS). A base station establishes (sets) connection to this DS, and packets are transmitted between the BSS and DS via the base station. The entire network extended by the DS is called an ESS (Extended Service Set). In the IEEE802.11 wireless LAN system, a description about implementation of the DS is not specified.

Communications between base stations are also used in a cellular phone system when a terminal connected to a given base station transmits data to a terminal connected to another base station.

The conventional wireless LAN system suffers the following problems.

(1) A practical protocol upon connecting base stations via a wireless communication is not established.

(2) Since a plurality of terminals are connected to a base station, poor reliability of communications between base stations seriously influences the entire system.

(3) Wireless resources are spent for communications between base stations and, in particular, in a system in which base stations and terminals are connected via wireless communications, the communication capacity within the area covered by each base station decreases.

BRIEF SUMMARY OF THE INVENTION

It is an object of the present invention to provide a base station apparatus which can connect wirelessly to another base station efficiently, and can communicate with the another base station without being influenced by a communication between the base station and terminals, and without influencing it.

It is another object of the present invention to provide a terminal apparatus which can communicate efficiently with the base station which can communicate with other base stations.

According to a first aspect of the present invention, there is provided a base station apparatus corresponding to a first base station apparatus of a plurality of base station apparatuses and connected to a plurality of terminal apparatuses, the first base station apparatus transmitting and receiving a plurality of first packets with respect to a second base station apparatus corresponding to another of the base station apparatuses and transmitting and receiving a plurality of second packets with respect to the terminal apparatuses, the first base station apparatus comprises: a transmitter unit configured to transmit a third packet to a second base station apparatus, the third packet corresponding to one of the first packets to be transmitted from the first base station apparatus and including a first data item, the second base station apparatus recognizing by the first data item that the first base station apparatus is one of the base station apparatuses, the third packet being used through an authentication process or an association process for connecting in wireless the first base station apparatus to the second base station apparatus.

According to a second aspect of the present invention, there is provided a base station apparatus corresponding to a first base station apparatus of a plurality of base station apparatuses and connected to a plurality of terminal apparatuses, the first base station apparatus transmitting and receiving a plurality of packets with respect to a second base station apparatus corresponding to another of the base station apparatuses, the second base station apparatus broadcasting synchronization signals, the first base station apparatus comprises: a synchronization unit configured to synchronize a transmission timing of the first base station apparatus for transmitting the packets with that of a second base station apparatus, based on the synchronization signals broadcasted by the second base station apparatus; and a transmitter unit configured to transmit a first packet to the second base station apparatus in the transmission timing of the first base station apparatus synchronized with that of the second base station apparatus, the first packet corresponding to one of the packets to be transmitted from the first base station and including a first data item, the second base station apparatus recognizing by the first data item that the first base station apparatus is one of the base station apparatuses, the first packet being used through an authentication process or an association process for connecting in wireless the first base station apparatus to the second base station apparatus.

According to a third aspect of the present invention, there is provided a terminal apparatus corresponding to a first terminal apparatus of a plurality of terminal apparatuses and connected to a base station apparatus, the first terminal apparatus transmitting and receiving a plurality of packets with respect to the base station apparatus and the terminal apparatuses other than the first terminal apparatus, a first terminal apparatus comprises: a receiver unit configured to receive a first packet which corresponds to a packet which is not addressed to the first terminal apparatus; and, a transmission control unit configured to control an operation for transmitting the packets from the first terminal apparatus, when the first packet satisfies a predetermined condition, and configured not to control the operation when the first packet does not satisfy the condition, the condition being that the first packet is transmitted and is to be received among the base station apparatus and the terminal apparatuses other than the first terminal apparatus.

BRIEF DESCRIPTION OF THE SEVERAL VIEWS OF THE DRAWING

FIG. 7A shows an example of an address table of the base station AP1;

FIG. 7B shows an example of an address table of the base station AP2;

FIG. 8A shows an example of system configuration for explaining NLOS (Non Line of Sight) communications;

FIG. 8B shows an example of system configuration for explaining LOS (Line of Sight) communications;

FIG. 9 is a view for explaining a method of using the address field of the MAC frame;

DETAILED DESCRIPTION OF THE INVENTION

Preferred embodiments of the present invention will be described hereinafter with reference to the accompanying drawings.

In the present invention, an IEEE802.11 wireless LAN system will be exemplified. However, the present invention is not limited to the IEEE802.11 wireless LAN system, but may be applied to other wireless LAN systems, wireless MAN (Metropolitan Area Network) systems of, e.g., FWA (Fixed Wireless Access), and BWA (Broadband Wireless Access) systems.

The communication system according to embodiments to be described hereinafter can be applied to a communication system which is comprised by a plurality of base stations and a plurality of terminals, the base stations inter-connecting wirelessly, each of the terminals connecting to one of the base stations either through wire or wirelessly. When a given base station connects to another base station wirelessly and connects to a terminal through wire, such base station must have a first communication unit used to communicate wirelessly with the another base station, and a second communication unit used to communicate with the terminal through wire.

In such communication system, the embodiments to be described hereinafter can be applied to a case wherein a base station connects wirelessly to another base station, and a case wherein a terminal connecting wirelessly to a base station communicates with the base station, and the like.

FIRST EMBODIMENT

The procedure until two base stations recognize each other's partners as base stations when one of the two base stations connects to the other, will be explained below.

Figure 1:
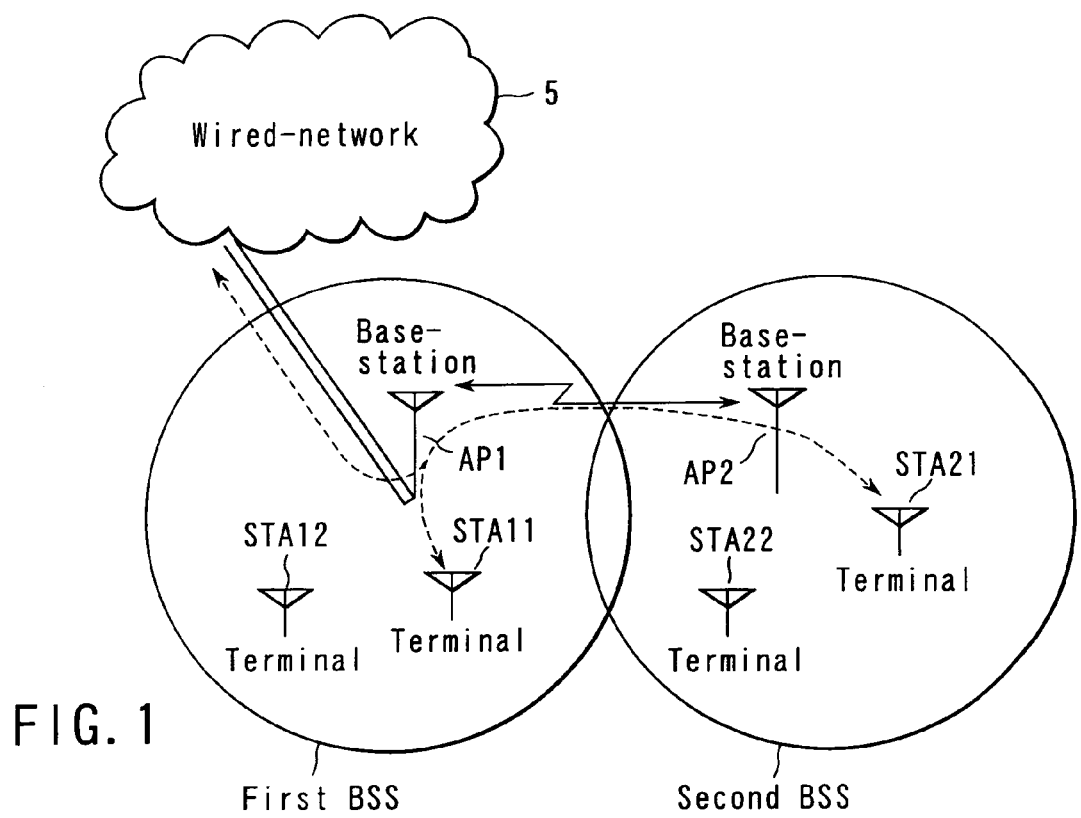
FIG. 1 shows an example of the overall arrangement of a wireless LAN system according to the first embodiment of the present invention.

FIG. 1 illustrates the arrangement of an ESS (Extended Service Set) formed by two BSSs (first and second BSSs) in an IEEE802.11 wireless LAN system.

The first BSS includes a base station AP1 serving as an access point, and a plurality of (e.g., two in this case) wireless terminals (to be simply referred to as terminals hereinafter) STA11 and STA12 connected to the base station AP1. Each of the terminals serves as a station in an IEEE802.11 wireless LAN system. The second BSS includes a base station AP2 serving as an access point, and a plurality of (e.g., two in this case) wireless terminals (to be simply referred to as terminals hereinafter) STA21 and STA22 connected to the base station AP2.

As shown in FIG. 1, the base station (e.g., AP1) may be connected to a wired network 5.

Figure 3:
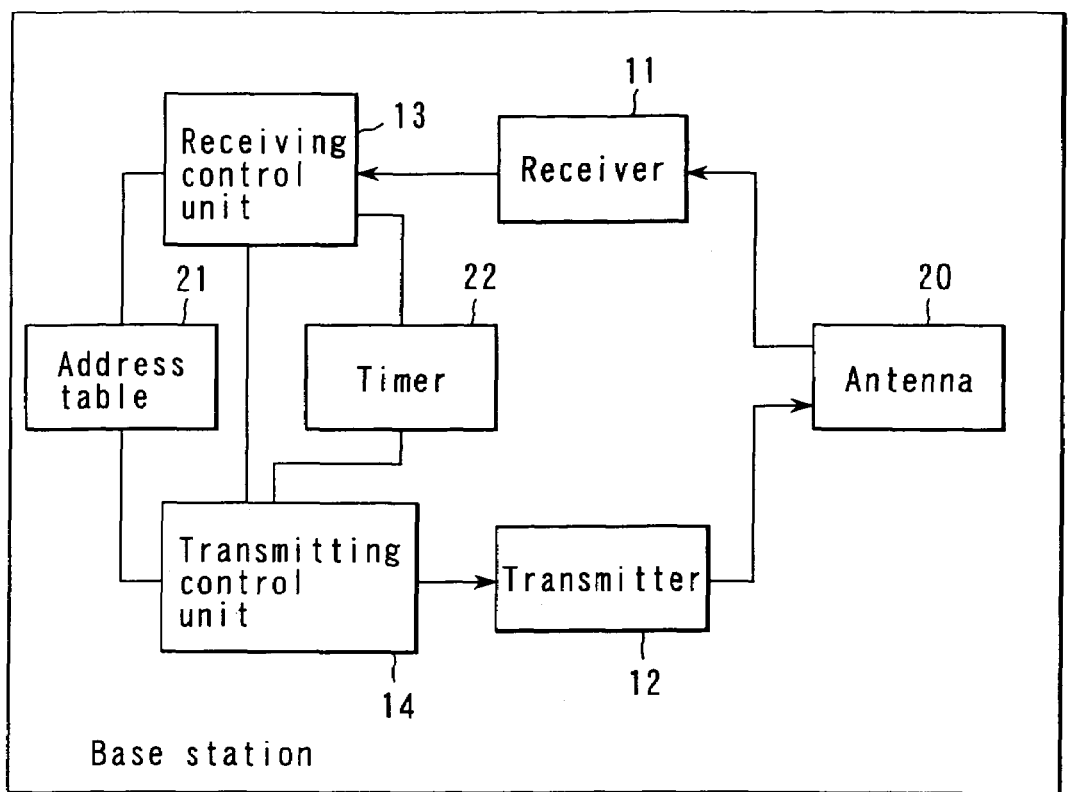
FIG. 3 is a functional block diagram of a base station apparatus.

FIG. 3 shows an example of the arrangement of principal part of the base stations AP1 and AP2. In the following description, when the base stations AP1 and AP2 need not be distinguished from each other (in case of an explanation common to the two base stations), they will be simply referred to as a base station AP.

In FIG. 3, a receiver 11 receives a signal (corresponding to a packet) transmitted from a terminal or another base station via an antenna 20, and generates a received signal via processes including demodulation and decoding. A transmitter 12 generates a signal (corresponding to a packet) to be transmitted to a terminal or another base station via the antenna 20, and supplies such signal to the antenna 20.

A packet received as the received signal by the receiver 11 is input to a receiving control unit 13, which executes a predetermined receiving process and the like that comply with IEEE802.11 (including IEEE802.11a and IEEE802.11b).

A transmitting control unit 14 executes a predetermined transmitting process and the like that include generation of packets to be broadcasted or subjected to a unicast to a terminal or another base station, and comply with IEEE802.11 (including IEEE802.11a and IEEE802.11b). A packet generated by the transmitting control unit 14 is transmitted to a terminal or another base station as a transmitting signal via the transmitter 12. An address table 21 and timer 22 will be explained later.

Figure 4:
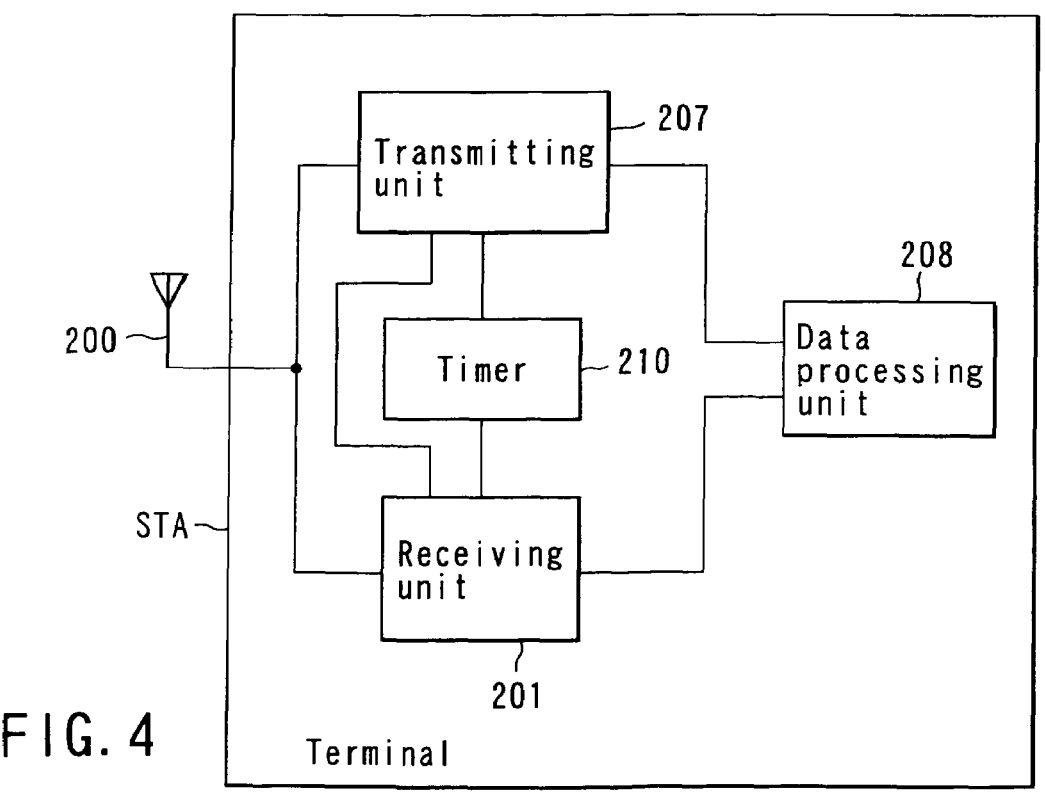
FIG. 4 is a functional block diagram of a terminal apparatus.

FIG. 4 schematically shows an example of the arrangement of principal part of the terminals STA11, STA12, STA21, and STA22. In the following description, when the terminals STA11, STA12, STA21, and STA22 need not be distinguished from each other (in case of an explanation common to all the terminals), they will be simply referred to as a terminals STAs and one of the terminals STA11, STA12, STA21, and STA22 will be simply referred to as a terminal STA.

The terminal STA comprises at least an antenna 200, receiving unit 201, transmitting unit 207, data processing unit 208, and timer 210.

For example, when a data to be transmitted as a packet is generated or a transmission instruction of a packet is issued by user's operation (a transmission request is generated), the data processing unit 208 passes the packet to the transmitting unit 207 in response to that request. The transmitting unit 207 converts the packet (e.g., an IP packet) into a MAC frame specified by IEEE802.11. The MAC frame as digital data is converted into a radio signal of a predetermined frequency (e.g., 2.4 GHz), and the radio signal is transmitted from the antenna 200 as a radio wave.

On the other hand, the receiving unit 201 converts a signal received by the antenna 200 into a MAC frame as digital data, extracts received data (packet) from an information field in this MAC frame, and passes that data to the data processing unit 208. In this case, the data processing unit 208 executes a process for, e.g., displaying the received data on a display. Note that the data processing unit 208 may execute various other data processes.

The timer 210 is used for a TSF (Timing Synchronization Function) specified by IEEE802.11 (including IEEE802.11a and IEEE802.11b). The timer (TSF timer) 210 will be described later.

A case will be explained below wherein the base station AP2 accesses the base station AP1 in the arrangement shown in FIG. 1. Assume that the base station AP1 does not know (recognize) the presence of the base station AP2. Even in this case, the base station AP2 can receive a beacon frame which is transmitted from the base station AP1 and specified by IEEE802.11 (including IEEE802.11a and IEEE802.11b).

Figure 5:
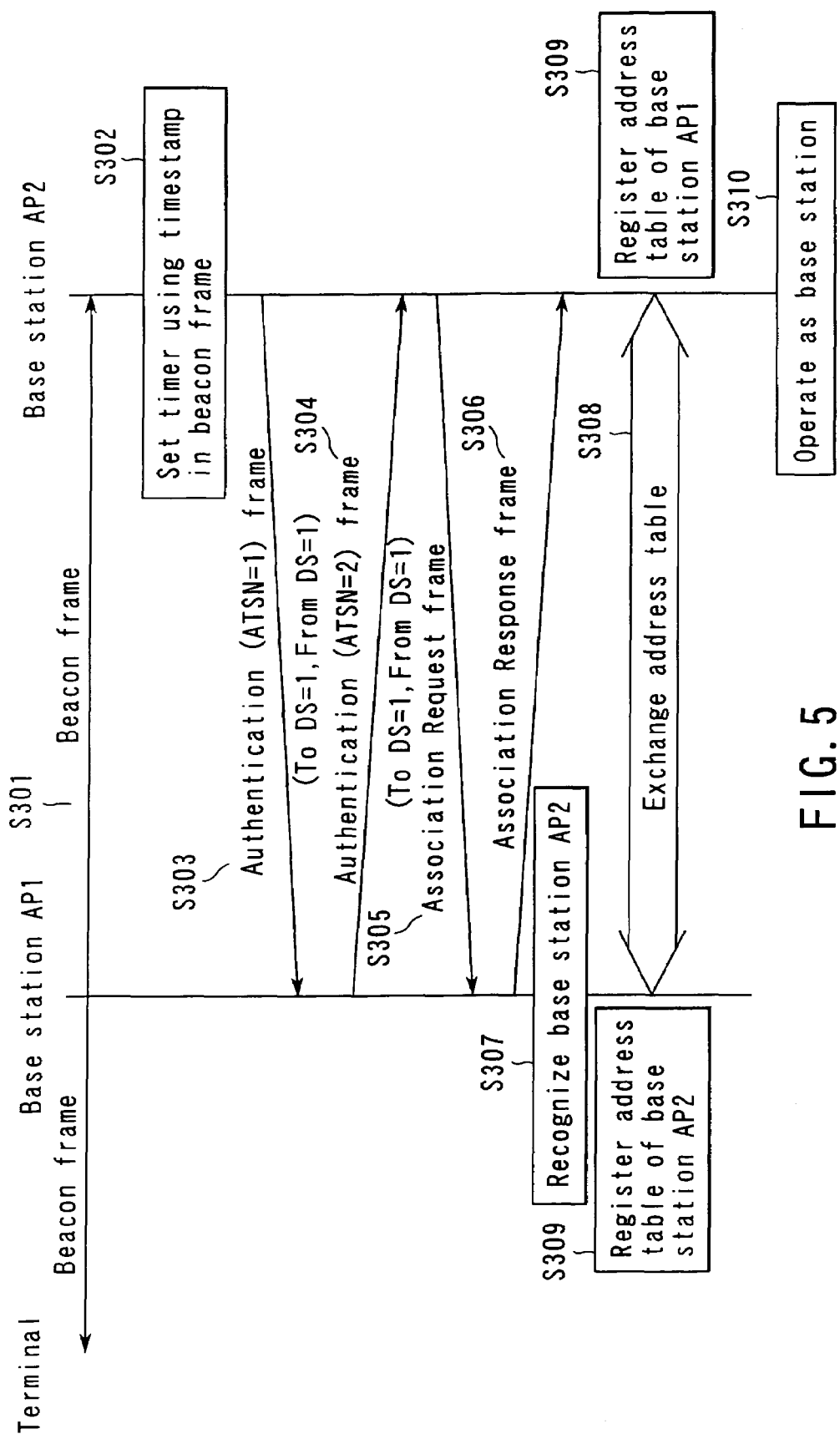
FIG. 5 is a chart for explaining a procedure until base stations AP1 and AP2 recognize each other's partners as base stations upon making communications between them.

FIG. 5 is a flow chart for explaining the procedure until the base stations AP1 and AP2 recognize each other's partners as base stations when the base station AP2 connects to the base station AP1. The following explanation will be given with reference to this flow chart.

According to the specifications of IEEE802.11 (including IEEE802.11a and IEEE802.11b), all terminals connected to a given base station are synchronized with the timer 22 of that base station in a BSS. That is, the base station has the timer (TSF (Timing Synchronization Function) timer) 22, and periodically transmits a beacon frame including the timer value to a terminal connecting to that base station. Upon receiving the beacon frame, the terminal adjusts its own timer (TSF timer) 210 to the timer value in a timestamp field contained in the beacon frame, thus synchronizing with the base station. Since the beacon frame has such function, it is also called a synchronization signal.

A case will be described below wherein the base station AP2 adjusts (synchronizes) the timer value of its own timer 22 to the timer 22 of the base station AP1 and then connecting to the base station AP1.

As shown in FIG. 5, the base station AP2 receives a beacon frame periodically transmitted from the base station AP1 (step S301).

According to the specifications of IEEE802.11 (including IEEE802.11a and IEEE802.11b), since the timestamp field of the received beacon frame is written with a copy (timestamp value) of the timer value of the timer 22 of the base station AP1, the base station AP2 sets the received timestamp value in its timer 22 (step S302).

The base station AP2 starts a procedure for making the base station AP1 recognize that the self station AP2 is a base station.

According to the specifications of IEEE802.11 (including IEEE802.11a and IEEE802.11b), authentication and association processes follow. In this embodiment, a data item which informs the base station AP1 that the base station AP2 is a base station is written in at least one of the frames used in authentication and association processes.

Figure 6:
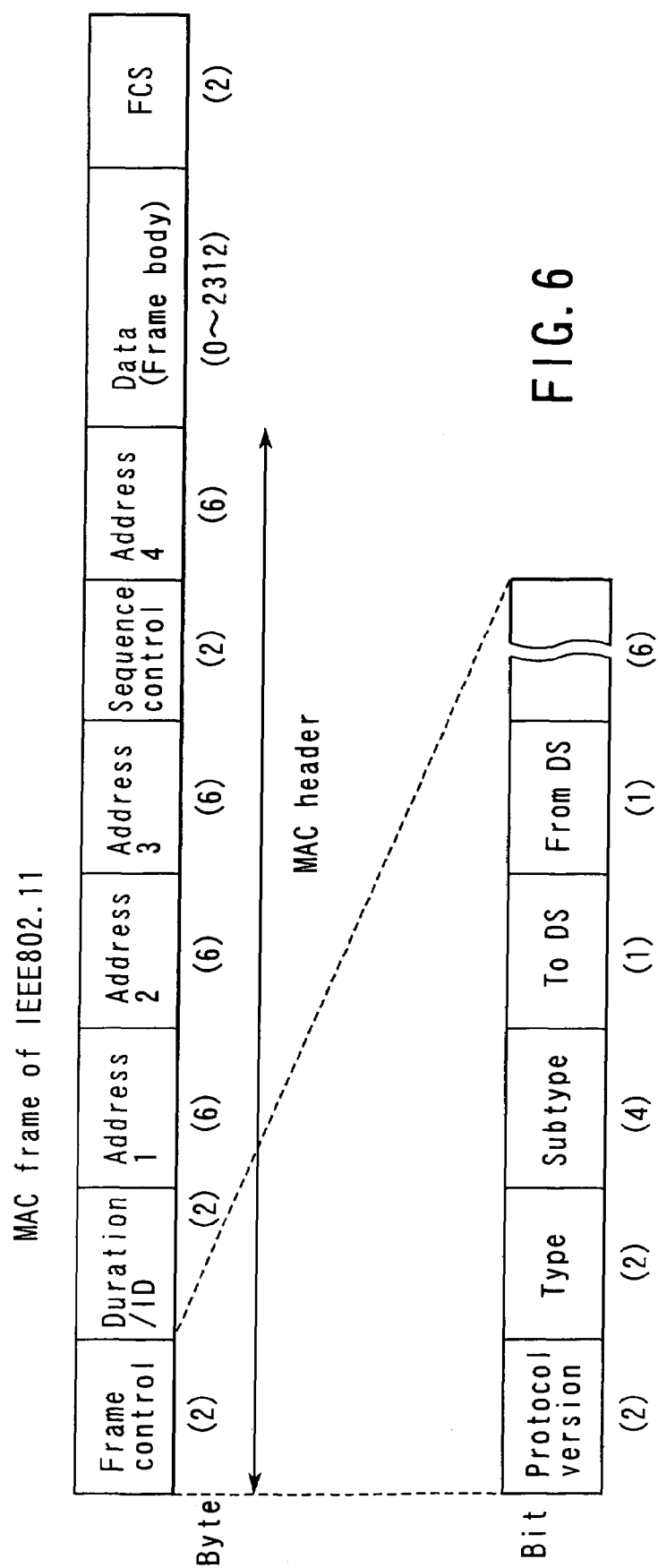
FIG. 6 is a view for explaining a MAC frame specified by IEEE802.11.

The MAC frame specified by IEEE802.11 is formed of a MAC header of the maximum of 30 bytes, which stores various kinds of control information, a data field that stores data at the maximum of 2312 bytes, and a frame check sequence (FCS) used to check if data are transmitted normally, as shown in FIG. 6.

The MAC frame includes three types of frames, i.e., a management frame such as an authentication frame, an association frame, or the like, a control frame used in access control such as an ACK (Acknowledgement) frame, an RTS (Request to Send) frame, a CTS (Clear to Send) frame, or the like, and a data frame for data communications. The type of each of these three MAC frames is indicated by "type" in a frame control field in the MAC header. Furthermore, "subtype" in the frame control field indicates the detailed type of a MAC frame such as beacon, authentication, association, ACK, RTS (Request to Send), CTS (Clear to Send), and the like.

The frame control field contains a "To DS" field (1 bit) and a "From DS" field (1 bit). These fields are used in a data frame, but are not used in other types of frames (e.g., authentication and association frames) since "0" is always written in these fields. In this embodiment, upon authentication (or association), the base station AP2 writes "1" in both of the "To DS" and "From DS" fields and transmits that frame to the base station AP1 upon the frame format shown in FIG. 6 to the base station AP1.

In FIG. 5, a frame with "To DS" and "From DS" fields="1" is transmitted upon authentication. In this case, the transmitting control unit 14 of the base station must additionally have a processing function of rewriting the contents of the "To DS" and "From DS" fields by "1" in a frame to be transmitted upon executing a process corresponding to authentication with the base station as a partner. On the other hand, the receiving control unit 13 of the base station must additionally have a processing function of checking the "To DS" and "From DS" fields in the received frame upon executing a process corresponding to authentication with the base station as a partner.

The base station AP2 transmits, to the base station AP1, a frame that requests authentication and is specified by IEEE802.11 (including IEEE802.11a and IEEE802.11b) (an authentication frame with authentication transaction sequence number (to be simply referred to as ATSN hereinafter)=1) (step S303). In this frame, the "To DS" and "From DS" fields are "1". Upon receiving this frame, since the "To DS" and "From DS" fields are "1", the base station AP1 transmits an authentication frame (ATSN=2) specified by IEEE802.11 (including IEEE802.11a and IEEE802.11b) to the base station AP2 under the assumption that the source of the received frame is a base station (step S304). The "To DS" and "From DS" fields in this frame are "1".

If authentication has succeeded, the base station AP2 then transmits an association request frame specified by IEEE802.11 (including IEEE802.11a and IEEE802.11b) to the base station AP1 (step S305). Upon receiving this frame, the base station AP1 transmits an association response frame specified by IEEE802.11 (including IEEE802.11a and IEEE802.11b) to the base station AP2 (step S306). If association has succeeded, the base station AP1 recognizes the base station Ap2 as a base station (step S307).

Upon association, a frame with "To DS" and "From DS"="1" may be transmitted.

According the specifications of IEEE802.11 (including IEEE802.11a and IEEE802.11b), a "capability information" field is inserted in such as association request, beacon, probe response frames, but a portion used to describe ESS and IBSS in a "capability information" field is used only in case of a beacon frame and a probe response frame. Hence, the information (the data item) that informs the base station AP1 that the base station AP2 is a base station may be written in this portion upon association. Also in this case, the base station AP1 can similarly recognize the base station AP2 as a base station as described above.

With the procedure described so far, the base station AP1 recognizes the base station AP2 as a base station.

For the purpose of relaying a frame from a first terminal in one BSS to a second terminal in the other BSS in a DS communication, each of the base stations may have an address table 21 that registers the addresses (e.g., MAC addresses) of terminals connected to each of the base station.

As shown in FIGS. 7A and 7B, the address table 21 registers the addresses (e.g., MAC addresses) of terminals connected to a given base station in correspondence with the address (e.g., MAC address) of that base station serving as a relay apparatus. For example, FIG. 7A shows an address table corresponding to the first BSS to which the base station AP1 belongs, and FIG. 7B shows an address table corresponding to the second BSS to which the base station AP2 belongs.

In the following description, the addresses (MAC addresses) of the base stations AP1 and AP2 are "AP1" and "AP2" respectively, using their reference symbols without change, and the addresses (MAC addresses) of the terminals STA11, STA12, STA21, and STA22 are "STA11", "STA12", "STA21", and "STA22" respectively, using their reference symbols without change. Also, the addresses (MAC addresses) of the base stations are used as identifiers (BSSID) of the BSSs to which the base stations belong.

At the time of completion of step S307 in FIG. 5, the base station AP1 has not acquired information (e.g., the address table shown in FIG. 7B) indicating terminals connected to the base station AP2 yet. Also, the base station AP2 has not acquired information (e.g., the address table shown in FIG. 7A) indicating terminals connected to the base station AP1 yet. Hence, the base stations AP1 and AP2 exchange their address tables with each other (step S308). As a result, the base station AP1 can acquire the address table shown in FIG. 7B in addition to that shown in FIG. 7A (step S309). Also, the base station AP2 acquires the address table shown in FIG. 7A in addition to that shown in FIG. 7B (step S309).

In this manner, since each base station has an address table of other base stations with which that base station can easily relay a data frame. That is, if a data frame received by a base station is addressed to a BSS other than that to which the self station belongs, the base station looks up the address table to determine a BSS and next base station to which that data frame is to be transmitted, and can transmit the data frame to the next base station.

Figure 2:
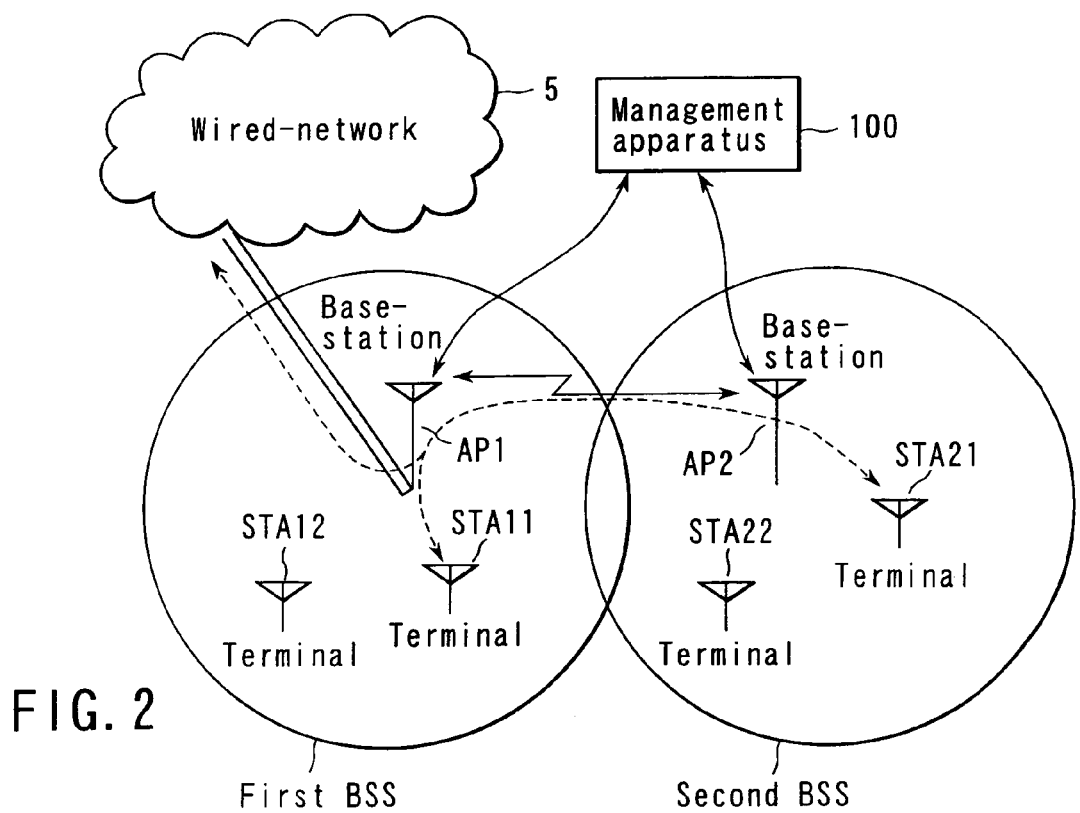
FIG. 2 shows an example of the overall arrangement of another wireless LAN system according to the first embodiment of the present invention.

The base stations AP1 and AP2 need not hold such address tables 21 by themselves. For example, as shown in FIG. 2, a management apparatus 100 that manages the address tables of all base stations together may be added, and may be connected to each of the base stations AP1 and AP2. In this case, the base station AP2 registers the address table (FIG. 7B) corresponding to the BSS of the self station in the management apparatus 100 in step S308 in FIG. 5. The base station may access the management apparatus 100 when it must look up the address table.

In a small-scale system, each base station may hold only the address table corresponding to the BSS of the self station, but need not hold that of another base station. In such case, when a data frame received by a base station in the system is addressed to a terminal of a BSS other than that to which the self station belongs, the base station may transmit the data frame to all other base stations.

In this manner, the base station AP2 is recognized by the base station AP1 as a base station and setup connection with the base station AP1, and can realize a DS communication with the base station AP1. At the same time, the base station AP2 can communicate with terminals in the second BSS of the self station. That is, the base station AP2 begins to output a beacon frame.

A terminal (e.g., STA21) in the second BSS receives a beacon frame transmitted from the base station AP2, and can then communicate with the base station AP2 and another terminal (e.g., STA22) in the second BSS. Also, a terminal (e.g., STA21) in the second BSS can communicate with the base station AP1 which belongs to the first BSS, via the base station AP2. Furthermore, a terminal (e.g., STA21) in the second BSS can communicate with a terminal (e.g., STA21) which belongs to the first BSS, via the base station AP1. Moreover, a terminal (e.g., STA21) in the second BSS can communicate with a terminal on the wired network via the base station AP1.

As described above, according to the first embodiment, wireless communication connection between base stations can be established, the DS can be easily formed and, hence, a new base station can be easily added. Since a new base station can be easily added as needed, prompt actions can be taken on broadening a communication area, and an improvement of communication quality with terminals in a very bad wireless communication environment.

Merits obtained upon adding a new base station will be described below with reference to FIG. 8A and FIG. 8B.

FIG. 8A shows a case wherein terminals STA501 to STA503 are present in a meeting room on the other side of a wall or the like from a base station AP1. In this case, communications between the base station AP1 and terminals STA501 to STA503 become NLOS (Non Line of Sight) communications due to the presence of the wall, resulting in a poor communication condition. Hence, a base station AP2 as a new base station is located at a position where it can easily communicate with the base station AP1 and the terminals STA501 to STA503, i.e., at a position where LOS (Line Of Sight) communications with the terminals STA501 to STA503 can be assured, as shown in FIG. 8B.

The base stations AP1 and AP2 are connected wirelessly, and the terminals STA501 to STA503 are connected to the base station AP2 wirelessly. Since the communication between the base station AP1 and the terminals STA501 to STA503 is established by way of the base station AP2 as a relay point, faster, higher-quality communications can be achieved compared to the arrangement shown in FIG. 8A.

In this way, a base station can be added not only in the wireless LAN system but also in a system of FWA and the like.

In the first embodiment, the timers 22 of the base stations AP2 and AP1 are synchronized (the two base stations transmit frames such as beacon frames and the like at nearly the same timing). Hence, the first and second BSSs can be synchronized, and a hidden-terminal problem between BSSs can be avoided. That is, the probability of collision upon transmitting frames between terminals, which can receive signals in the first and second BSSs, can be avoided by the NAV (Network Allocation Vector) specified by IEEE802.11 (including IEEE802.11a and IEEE802.11b). According to the first embodiment, interference can be eliminated, and the communication quality in respective BSSs can be improved.

Since the timers 22 of the base stations AP2 and AP1 are synchronized, these base stations transmit beacon frames at nearly the same timing. Therefore, upon transmitting a beacon frame from the base station AP2, a beacon frame from the base station AP1 cannot often be received since it is transmitted at the same timing.

Hence, after the transmitting control unit 14 of the base station AP2 transmits a beacon frame a predetermined number of times, it may stop transmission of beacon frame, and receive a beacon frame transmitted from the base station AP1, to check if the transmission timing of the beacon frame is synchronized with that of the base station AP1. And transmission timing of beacon frames may be adjusted.

Or, when the base station AP2 does not receive any beacon frame from the base station AP1 in a receiving phase, it may be determined that the beacon frame transmission timing is synchronized with that of the base station AP1. On the other hand, when the base station AP2 receives a beacon frame from the base station AP1 in a receiving phase, it may adjust the beacon frame transmission timing of the self station to that of the base station AP1.

Furthermore, when the base stations AP1 and AP2 transmit beacon frames using different channels, the base station AP2 may have another receiver unit for the channel that the base station AP1 uses to transmit a beacon frame. In this case, the base station AP2 can receive a beacon frame from the base station AP1 even while it transmits a beacon frame, thus adjusting the beacon frame transmission timing to that of the base station AP1.

SECOND EMBODIMENT

In the first embodiment, the base station AP2 adjusts (synchronizes) the timer value of its timer 22 to that of the base station AP1, and then access the base station AP1 (step S302 in FIG. 5). However, the present invention is not limited to such specific case, and the base station AP2 may operate asynchronously with the base station AP1. That is, the process in step S302 in FIG. 5 (i.e., the process for adjusting the timer value of the timer 22 of the self station to that of the base station AP1 on the basis of a beacon frame transmitted from the base station AP1) may be omitted.

In case that the base stations AP1 and AP2 operate whether synchronously or asynchronously, when the base station AP1 (AP2) receives frames which are exchanged within the first BSS (the second BSS) to which the base station AP1 (AP2) belongs, the base station AP1 (AP2) sets a transmission wait time (sets NAV) to avoid collision.

In case that the base stations AP1 and AP2 operate asynchronously, they transmit beacon frames at different timing. In this case, the base station AP2 receives not only frames which are exchanged within the first BSS to which the base station AP1 belongs, but also beacon frames from the base station AP1. According to the prior art, the base station AP2 sets the NAV, when it receives frames which are exchanged within the first BSS and the beacon frames from the base station AP1 to avoid collision with them. For this reason, communications between the base station AP2 and the base station AP1 and those in the second BSS are extremely suppressed. The same applies to the base station AP1.

To solve such a problem, the base station AP may deliberately permit radio wave collision, and give priority to communications between base stations over those in the BSS to which the self station belongs.

Upon receiving a frame, the base station according to the second embodiment checks the address field of the frame, and (a1) the base station executes a predetermined receiving process, when the received frame is a frame transmitted to the self station from another BSS different from the BSS to which the self station belongs or a frame whose destination or source is a terminal in the BSS of the self station, (a2) the base station makes an operation for suppressing transmission of frames from the self station (sets the NAV), when the received frame is a frame which is used in communications between terminals in the BSS to which the self station belongs without being relayed by the self station, furthermore, (a3) the base station discards the received frame without processing it (without setting any NAV), when the received frame is a frame which is used for communicating only in another BSS different from the BSS to which the self station belongs.

In case of (a3), since no NAV is set, when the base station AP2 (or AP1) has a frame to be transmitted to the other base station AP1 (or AP2), the base station AP2 (or AP1) can quickly start transmission to the other base station AP1 (or AP2).

And when the base station AP2 (or AP1) has a frame to be transmitted to a terminal in a BSS to which the self station belongs, if no communications are made in the BSS, the base station can quickly start transmission to that terminal.

When a given terminal can receive frames in the first and second BSSs, according to the prior art, the terminal suppresses the transmission of frame by the NAV when the terminal receives a frame other than a frame which is addressed to the self apparatus.

Hence, upon receiving a frame, a terminal according to the second embodiment checks the address field of the received frame, and (b1) the terminal executes a predetermined receiving process, when the received frame is addressed to the self apparatus, (b2) the terminal makes an operation for suppressing transmission of frames from the self apparatus (sets the NAV), when the received frame is a frame which is transmitted to or from any one of the terminals or a base station in the BSS to which the self apparatus belongs (i.e. when the received frame contains the address (like "BSSID") of the base station of the BSS to which the self apparatus belongs), (b3) the terminal discards the received frame without processing it (without setting any NAV), when the address (like "BSSID") of the base station of the BSS to which the self apparatus belongs is not contained the received frame.

In this manner, since each terminal according to the second embodiment does not set any NAV when it receives a frame which does not contain the address (like "BSSID") of the base station of the BSS to which the self apparatus belongs, if there is a frame to be transmitted, the terminal can efficiently start transmission without any transmission wait time.

Such processes for the received frame in the base station AP and terminal STA are applied not only to a case wherein the base stations AP1 and AP2 operate asynchronously, but are applied to a case wherein the base stations AP1 and AP2 operate synchronously as in the first embodiment, so as to make efficient communications.

The aforementioned processes for the received frame in the base station AP and terminal STA can be implemented by checking four address fields ("address 1", "address 2", "address 3", "address 4"), and the "To DS" and "From DS" fields in the control field in the MAC frame shown in FIG. 6.

How to use respective fields specified by IEEE802.11 (including IEEE802.11a and IEEE802.11b) will be briefly explained below.

The "To DS" field is used in a data frame. When a frame is transmitted to the base station in DS communications, "1" is set in this field; otherwise, "0" is set.

The "From DS" field is used in a data frame. When a frame is transmitted from the base station in DS communications, "1" is set in this field; otherwise, "0" is set.

A data frame in which both the "To DS" and "From DS" fields are "0", the frame is a data frame which is transmitted from one terminal to another terminal in one BSS. A data frame in which the "To DS" field is "1" and the "From DS" field is "0", is a data frame transmitted from a given terminal to a base station though a DS communication. A data frame in which the "To DS" field is "0" and the "From DS" field is "1", is a data frame transmitted from a given base station to a terminal through a DS communication. A data frame in which both the "To DS" and "From DS" fields are "1", is a data frame transmitted from a given base station to another base station through a DS communication.

The four address fields respectively contain one of the BSSID (basic service set identifier), source address (SA), destination address (DA), transmitter address (TA), and receiver address (RA).

The BSSID indicates a BSS where the source of the frame is present. Normally, the BSSID is the MAC address of the base station.

The DA indicates the MAC address of a destination that finally receives the frame.

The SA indicates the MAC address of the source that generated the frame.

The TA indicates the MAC address of a source which received and transmitted the frame as a relay point for transmitting the frame to the DA.

The RA indicates the MAC address of a destination which receives the frame as a relay point for transmitting the frame to the DA.

The method of using the four address fields and "To DS" and "From DS" fields will be described below with reference to FIG. 9 taking as an example a case wherein a frame is to be transmitted from the terminal STA21 to the terminal STA11.

Assume that the base station AP2 is recognized as a base station by the base station AP1 via the procedure shown in FIG. 5.

Figure 10:
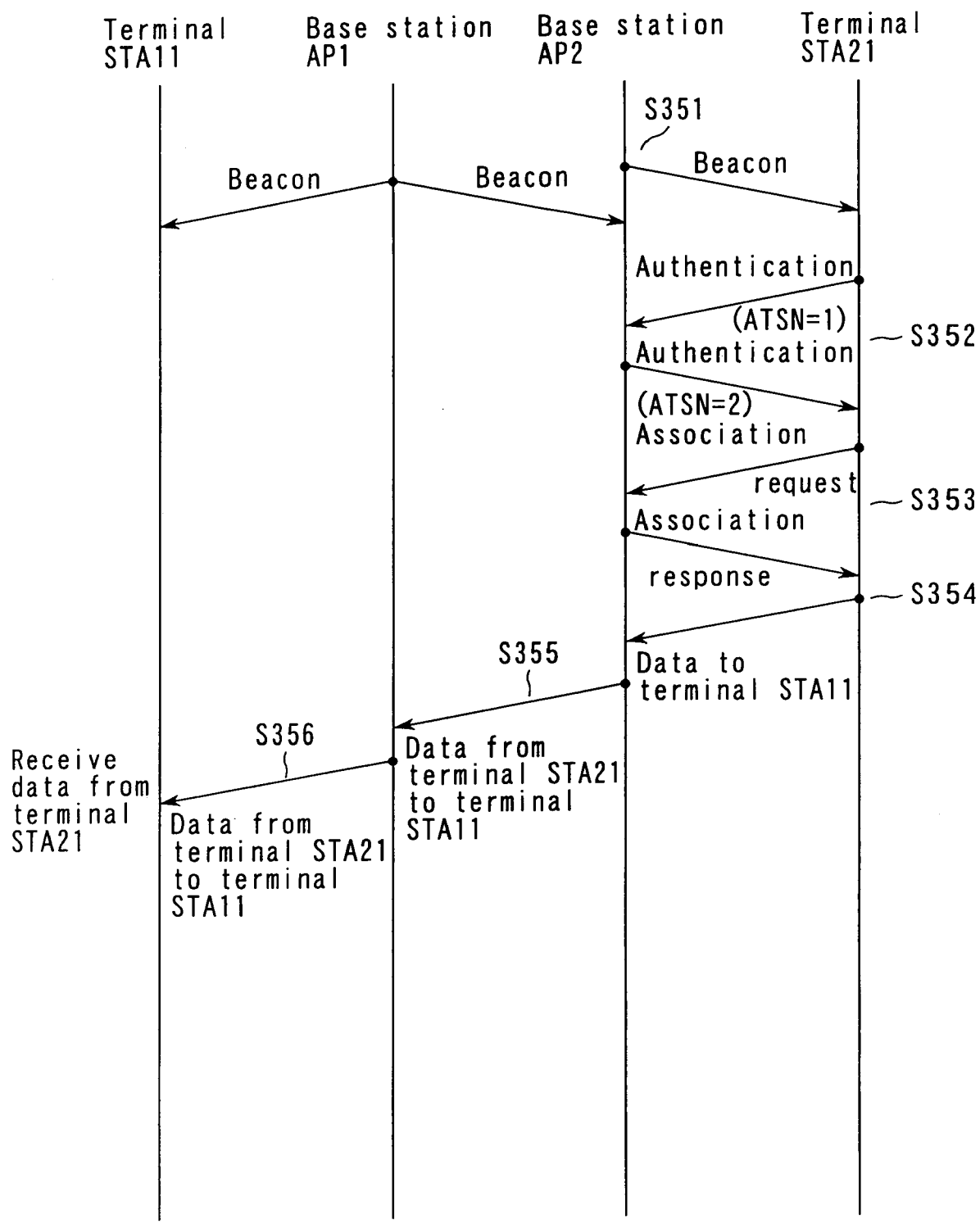
FIG. 10 shows a sequence for explaining the procedure of wireless communications via two base stations.

As shown in FIG. 10, the terminal STA21 receives a beacon frame transmitted from the base station AP2 (step S351), and executes authentication and association (steps S352 and S353). If authentication and association have succeeded, the terminal STA21 transmits a data frame addressed to the terminal STA11.

In such case, the terminal STA21 transmits the data frame to the base station AP2 (step S354). The uppermost column of FIG. 9 shows the contents of the four address fields and "To DS" and "From DS" fields in the data frame at step S354.

The base station AP2 then transmits the data frame to the base station AP1 (step S355). The second uppermost column of FIG. 9 shows the contents of the four address fields and "To DS" and "From DS" fields in the data frame at step S355.

Furthermore, the base station AP1 transmits the data frame to the terminal STA11 (step S356). The third uppermost column of FIG. 9 shows the contents of the four address fields and "To DS" and "From DS" fields in the data frame at step S356.

The processing operation upon receiving a data frame in the terminal STA and base station AP will be described below with reference to FIGS. 11A and 11B. Note that, upon exchanging a data frame in FIGS. 11A and 11B, an RTS/CTS frame may be exchanged in advance, and an ACK frame is transmitted from the receiving side of a unicast data frame.

Figure 11A:
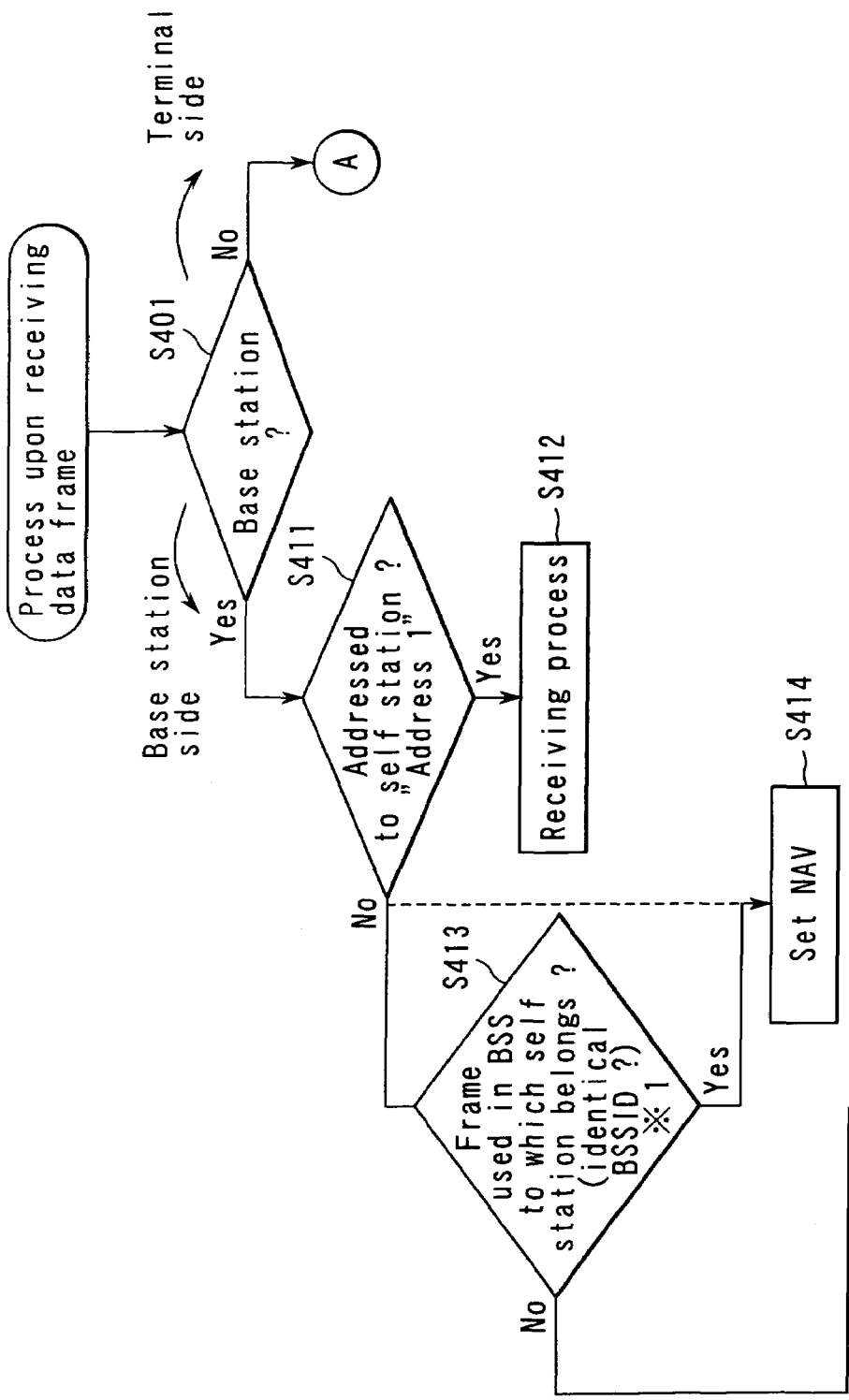
FIGS. 11A and 11B are flow charts for explaining processes upon receiving a data frame in a base station and terminal.
Figure 11B:
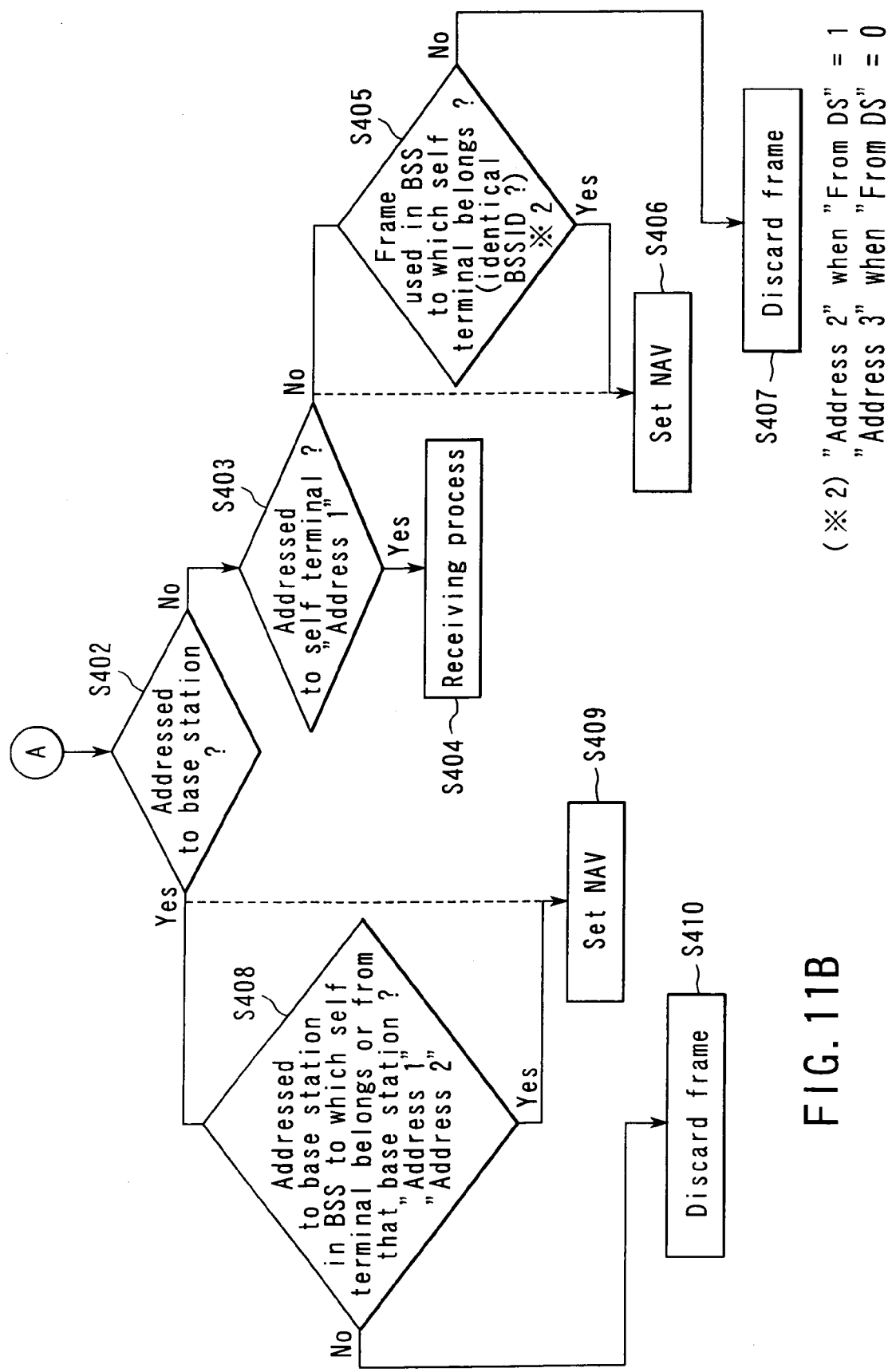

Note that the conventional operation is indicated by the dotted line in FIG. 11A and 11B, for clarifying differences between the conventional system and the system according to the second embodiment.

The receiving processing operation of a data frame in the base station AP will be explained first. The base station AP receives a frame (step S401). If the received frame is a frame which addressed to the self station, in which the address of the self station is described as "DA", "RA", or "BSSID" (i.e. the received frame is a frame which is transmitted from another BSS different from the BSS to which the self station belongs to, or a frame whose destination or source is a terminal in the BSS of the self station) (step S411), the base station AP executes a receiving process corresponding to the received frame (step S412).

If the received frame is a data frame that is used in communications between terminals in the BSS to which the self station belongs (for example a data frame that is used in communications between terminals in the BSS to which the self station belongs without being relayed by the self station) (step S413), the flow advances to step S414, and the base station AP makes an operation for suppressing transmission of a data frame from the self station (sets the NAV).

If it is determined in step S413 that the received frame is a data frame which is used for communicating in another BSS different from the BSS to which the self station belongs, the flow advances to step S415, and the base station AP discards the frame (without setting any NAV, although the NAV is set in such case in the conventional system).

More specifically, as shown in FIG. 11A, if the address of the self station is stored in the "address 1" field of the received frame in step S411, the base station executes a predetermined receiving process for the received frame (step S412).

In step S413, when the "From DS" field of the received frame is "1" and the "address 2" field describes, as "TA" or "BSSID", the MAC address of the self station or the address of a terminal in the BSS to which the self station belongs, or when the "From DS" field of the received frame is "0" and the "address 1" field describes, as "BSSID" or "DA", the MAC address of the self station or the address of a terminal in the BSS to which the self station belongs, the flow advances to step S414, and the base station AP makes an operation for suppressing transmission of a data frame from the self station (sets the NAV).

If it is determined in step S413 that the received frame is other than the aforementioned frames, i.e., it is a data frame, which is used for communicating in another BSS different from the BSS to which the self station belongs, the base station AP discards the frame without processing it (without setting any NAV) (step S415).

The data frame receiving process operation in the terminal STA will be explained below.

Upon receiving a frame (step S401), basically, if the received frame is not addressed to the base station ("To DS"=0) and a address of the self apparatus is described as "DA" in the received frame (step S403), the flow advances to step S404, and the terminal STA executes a receiving process for the received frame.

In step S403, when the address field of the received frame does not describe the address of the self apparatus as "DA", if the address of the base station in the BSS to which the self apparatus belongs is described as "BSSID", "SA", "DA", "TA", or "RA". (step S405), the flow advances to step S406, and the terminal STA executes an operation for suppressing transmission of a data frame from the self apparatus (sets the NAV).

If the received frame is addressed to the base station (step S402), and the address field of the received frame contains the address of the base station in the BSS to which the self apparatus belongs, as "BSSID", "SA", "DA", "TA", or "RA" (step S408), the flow advances to step S409, and the terminal STA executes a operation for suppressing transmission of a data frame from the self apparatus (sets the NAV).

In step S408, if the address field of the received frame does not contain any address of the base station in the BSS to which the self apparatus belongs, the flow advances to step S410, and the terminal STA discards the frame without processing it (without setting any NAV).

More specifically, as shown in FIG. 11B, in step S402, if the "To DS" field of the received frame is "0", and the received frame is not addressed to the base station, the flow advances to step S403. In step S403, if the self MAC address is described as "DA" in "address 1" of the received frame, the terminal STA executes a receiving process corresponding to the received frame (step S404).

If the received frame is not addressed to the self apparatus (step S403), the flow advances to step S405. In step S405, if the received frame is not addressed to the self apparatus but addressed to a terminal or base station in the BSS to which the self apparatus belongs, the terminal STA sets the NAV. That is, if the "From DS" field in the received frame is "1" and the "address 2" field describes the address of the base station of the BSS to which the self apparatus belongs, as "BSSID" or "TA", or if the "From DS" field is "0" and the "address 3" field describes the address of the base station of the BSS to which the self apparatus belongs, as "SA", the flow advances to step S406, and the terminal STA sets the NAV.

In step S405, if the received frame is addressed neither to the self apparatus nor to a terminal or base station in the BSS to which the self apparatus belongs, the terminal STA discards the received frame (step S407).

If the "To DS" field of the received frame is "1" and the received frame is addressed to the base station (step S402), the flow advances to step S408. In step S408 if the address of the base station in the BSS to which the self apparatus belongs is described as the destination or source of the received frame, i.e., the address of the base station in the BSS to which the self apparatus belongs is described in "address 1" or "address 2" as "BSSID", "RA", "TA", "SA", or "DA", the terminal STA sets the NAV (step S409).

In step S408, if the address of the base station in the BSS to which the self apparatus belongs is not described as the destination or source of the received frame, the flow advances to step S410, and the terminal STA discards the received frame.

In case of the base station AP, the aforementioned processes are executed by the receiving control unit 13, which controls the transmitting control unit 14. In case of the terminal STA, the aforementioned processes are executed by the receiving unit 201, which controls the transmitting unit 207.

In this way, upon receiving a frame, if the received frame is a data frame which is used for communicating only in another BSS different from the BSS to which the self station belongs (although the NAV is set in the conventional system), the base station AP discards the frame without processing it (without setting any NAV). Therefore, if there is a frame to be transmitted to another base station, the base station AP can quickly start transmission of frame to the base station in the other base station. In this manner, upon receiving a frame to be exchanged with the other base station, the base station deliberately permits radio wave collision, and gives priority to communications between the other base station and the self station, thus improving the efficiency of communications between the other base station and the self station.

Upon receiving a frame, if the address field of the received frame does not contain the address (as "BSSID" or the like) of the base station in the BSS to which the self apparatus belongs (although the NAV is set in the conventional system), the terminal STA discards the frame without processing it (without setting any NAV). Hence, if there is a frame to be transmitted, the terminal STA can efficiently start transmission without idle transmission wait time.

THIRD EMBODIMENT

The third embodiment will explain communications between base stations when one of the base stations AP1 and AP2 (e.g., AP2 in this case) has a directional antenna in the wireless LAN system shown in FIG. 1. That is, a case will be explained below wherein the base station AP2 directs a beam of the directional antenna to the base station AP1 for communication between the base stations. In the following description, a case will be exemplified wherein the base station AP2 has a directional antenna, and the same applies to a case wherein the base station AP1 has a directional antenna.

Note that the process for making the base station AP1 recognize the base station AP2 as a base station uses the method described in the first or second embodiment.

[Overall Arrangement]

Figure 12:
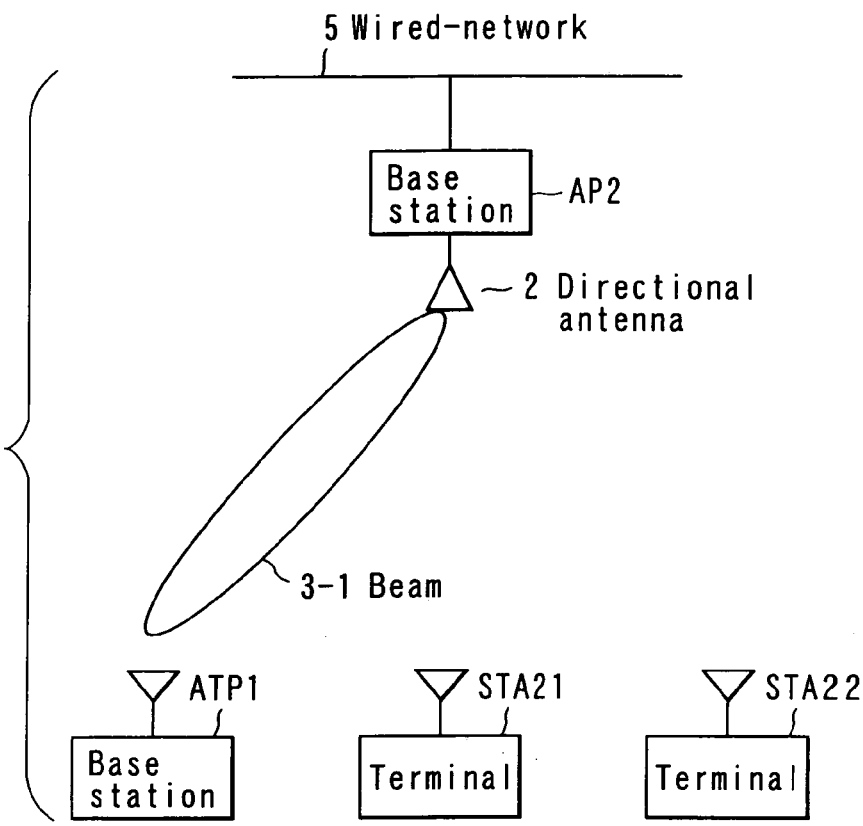
FIG. 12 is a diagram showing an example of the arrangement of principal part of a wireless LAN system according to the third embodiment of the present invention.

FIG. 12 shows a wireless communication system according to the third embodiment, and the same reference numerals denote the same parts as in FIG. 1. The base station AP2 comprises a directional antenna 2 in place of the antenna 20 in FIG. 3. The directional antenna 2 forms one relatively narrow directive pattern (to be referred to as a directive beam or antenna beam hereinafter) 3-1 to communicate with one of the base station AP1 and the terminals STA21 and STA22.

As shown in FIG. 12, the base station AP2 may be set at a specific fixed position, and may be connected to the wired network 5.

[About Base Station Apparatus]

The arrangement of the base station AP1 according to this embodiment is substantially the same as that in FIG. 3, except that the antenna 20 is replaced by directional antenna 2.

An example of the detailed arrangement of the directional antenna 2 will be explained below using FIG. 13.

Figure 13:
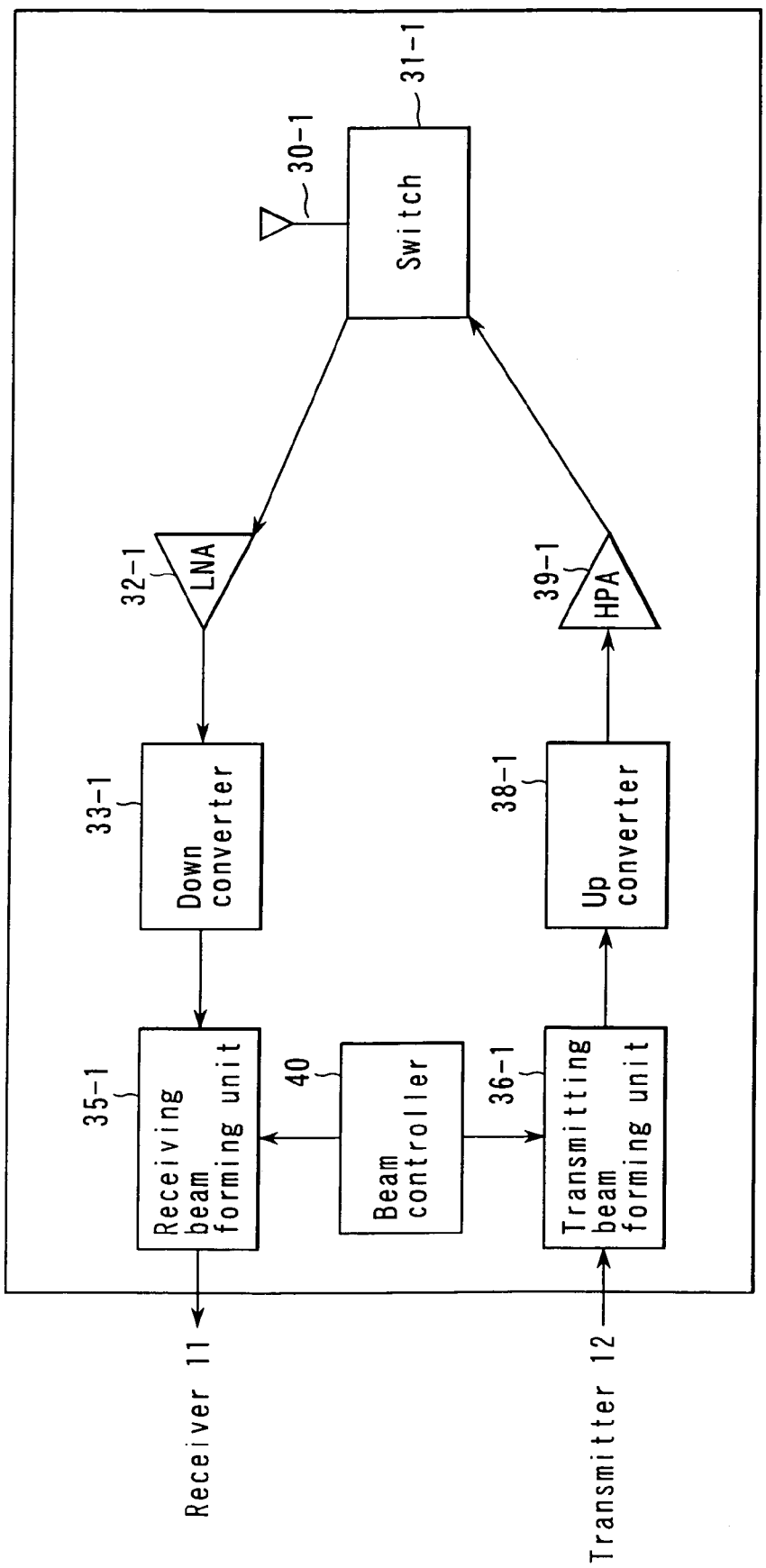
FIG. 13 is a block diagram showing an example of the arrangement of a directional antenna 2.

As shown in FIG. 13, the directional antenna 2 has an antenna element 30-1, transmission/reception switch 31-1, low-noise amplifier (LNA) 32-1, down converter 33-1, receiving beam forming unit 35-1, transmitting beam forming unit 36-1, up converter 38-1, high-frequency power amplifier (HPA) 39-1, and beam controller 40.

The operation of the directional antenna 2 will be described below. An RF signal received by the antenna element 30-1 is input to the LNA 32-1 via the transmission/reception switch 31-1, and is amplified to a predetermined level. The RF signal amplified by the LNA 32-1 is input to the down converter 33-1 which converts the frequency band of the RF signal from the radio frequency (RF) to the intermediate frequency (IF) or baseband (BB), and the converted signal is input to the receiving beam forming unit 35-1.

The receiving beam forming unit 35-1 forms a receiving antenna beam by weighting and combining the input signal by a receiving complex weighting factor set by the beam controller 40. A signal corresponding to the receiving antenna beam from the receiving beam forming unit 35-1 is supplied to the receiver 11 in FIG. 3.

On the other hand, the transmitting beam forming unit 36-1 receives a transmitting signal TS1 from the transmitter 12 in FIG. 3. The transmitting beam forming unit 36-1 multiples the input transmitting signal by a transmitting complex weighting factor set by the beam controller 40.

The output signal from the transmitting beam forming unit 36-1 is input to the up converter 38-1. The up converter 38-1 converts the frequency band of that output signal (transmitting signal) from the intermediate frequency (IF) or baseband (BB) to the radio frequency (RF), and inputs the converted signal to the HPA 39-1. The transmitting signal amplified by the HPA 39-1 is supplied to the antenna element 30-1 via the switch 31-1, and is then transmitted to the base station AP or terminal STA.

The beam controller 40 sets the receiving complex weighting factor for the receiving beam forming unit 35-1, and the transmitting complex weighting factor for the transmitting beam forming unit 36-1. In this case, weighting factors used to communicate with an identical base station or terminal are set.

In this embodiment, the base station AP2 uses relative position information of the base station AP1 with reference to the position of the base station AP2 so as to direct a beam of the directional antenna toward the base station AP1.

Figure 14:
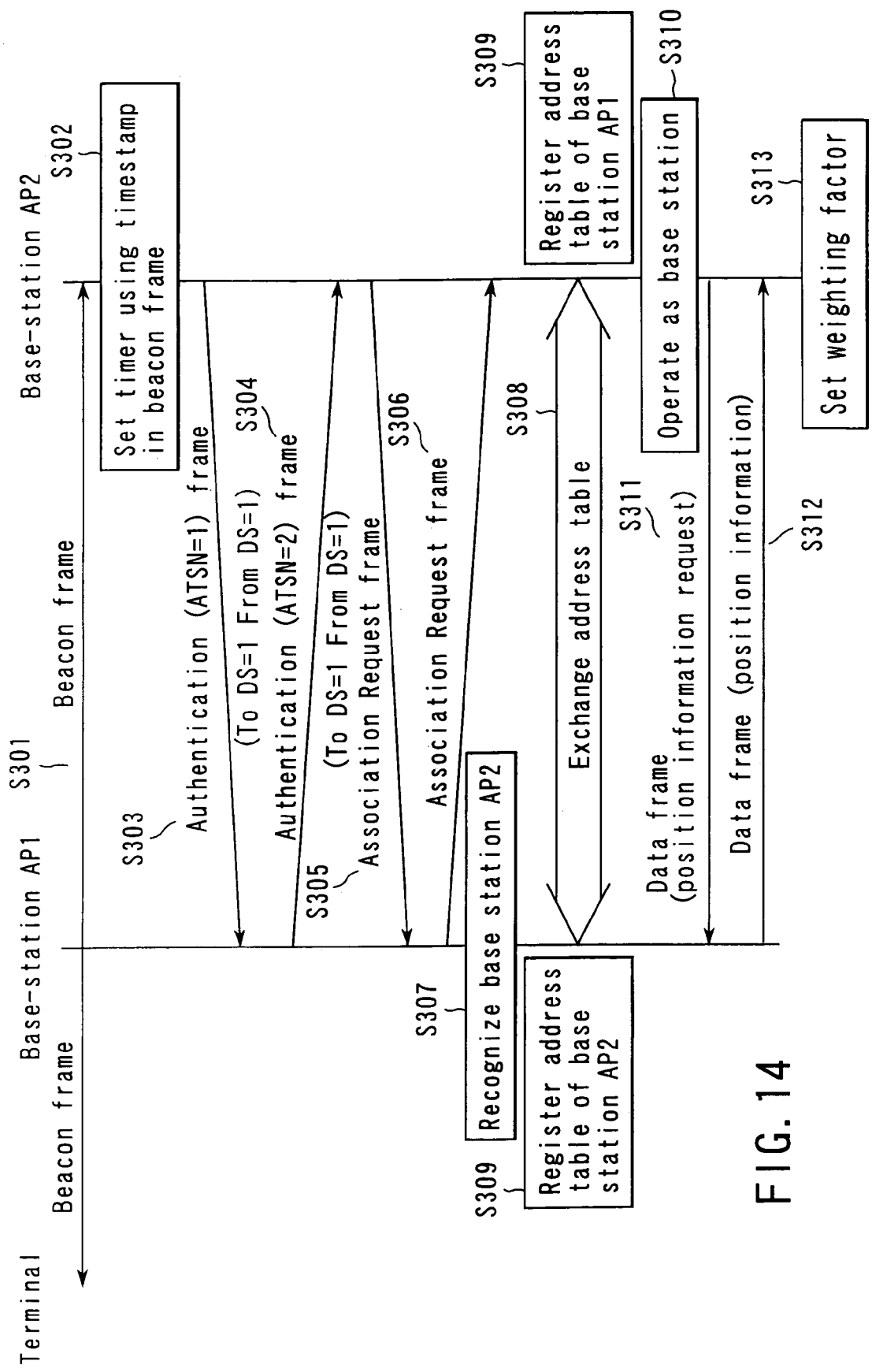
FIG. 14 is a flow chart for explaining a procedure until base stations AP1 and AP2 recognize each other's partners as base stations upon making communications between them.

In this case, as shown in FIG. 14, after an authentication process (authentication, association) with the base station AP1 (see the description of FIG. 5), the base station AP2 may request the base station AP1 to send position information (x1, y1, z1) of the base station AP1 (step S311). In this manner, the position information (x1, y1, z1) of the base station AP1 is obtained (step S312). The base station AP2 calculates the difference between the position information (x1, y1, z1) of the base station AP1 and position information (x2, y2, z2) of the self station to obtain the relative position information of the base station AP1.

The base station AP2, which has acquired the relative position information of the base station AP1, sets the receiving and transmitting complex weighting factors based on the acquired information, to direct the beam of the directional antenna toward the base station AP1, and uses these factors in wireless communications with the base station AP1 later (step S313).

In this case, the base stations AP1 and AP2 may recognize their position information using a GPS (Global Positioning System) or the like, or based on value predetermined to each of the base station.

Or the base station AP2 may recognize the position information of the base station AP1 based on, e.g., user's input. In such case, when the position information of the base station AP1 is input as absolute position information (x1, y1, z1), the base station AP2 calculates the difference from its absolute position information (x2, y2, z2) to obtain relative position information of the base station AP1 with reference to the position of the base station AP2. Alternatively, relative position information may be given in advance.

The position information is used to set weighting factors for forming the beam of the directional antenna. If the base stations are nearly at the same levels, the weighting factors may be set by omitting information of the z-axis or the like.

As described above, according to the third embodiment, the communication quality between the base stations can be improved using a directive beam. Especially, when the third embodiment is used in combination with the second embodiment, the arrangement of the third embodiment is effective to reduce the probability of collision of radio signals, which may occur when NAV is not set.

Another method of determining the weighting factors of the directional antenna in the base station AP2 will be explained below. That is, the base station AP2 may indirectly obtain the position information of the base station AP1 from frames exchanged between the base stations.

The frames to be exchanged include all frames to be exchanged between the base stations such as frames used in authentication and association, combinations of RTS/CTS upon transmitting a data frame, a data frame and ACK response, and the like.

The base station AP2 sets weighting factors of the directional antenna on the basis of the angle of arrival of a frame transmitted from the base station AP1. The base station AP2 continuously receives frames transmitted from the base station AP1 and corrects the angle of a beam spread of the directional antenna if it determines that it is necessary. When it is determined that the angles of arrival falls within a given range after some frame exchanges, beam parameters may be set to narrow down the beam width to that range.

The base station AP2 transmits a signal to the base station AP1 using an antenna beam formed based on the set weighting factors.

This method can be used to improve the accuracy of the angle of beam spread of the directional antenna even when, for example, the base station AP2 has already acquired the position information of the base station AP1 in step S312 in FIG. 14.

In this manner, since the base station AP2 corrects the weighting factors of its directional antenna on the basis of the angle of arrival of the received frame, the accuracy of the weighting factors used to form the beam of the directional antenna can be improved, and the beam width can be narrowed down. In this manner, the influences of interference from the base station AP2 on another base station or terminal STA using an identical channel can be further reduced, thus expanding the communication capacity.

Especially, when this embodiment is combined with the second embodiment, collision of radio signals, which may occur when NAV is not set, can be reduced.

In the third embodiment, only the base station AP2 has a directional antenna and exchanges frames by directing the antenna beam toward the base station AP1 in communications between the base stations. However, the present invention is not limited to such specific cases, and both the base stations may have directional antennas, and may exchange frames by directing antenna beams toward the partner base stations. In such case, the arrangement of the base station AP1 is the same as that shown in FIG. 13 described in the third embodiment.

Since the base station AP1 sets the weighting factors to direct the beam of its directional antenna toward the base station AP2, it must also recognize the position information of the base station AP2. In this case, the base station AP1 can execute the procedure in steps S311 to S313, as has been explained above with reference to FIG. 14.

Since the two base stations that are to undergo communications direct the beams of their directional antennas to each other so as to exchange frames, the communication quality between the base stations can be further improved compared to a case wherein only one of the two base station has a directional antenna.

Therefore, when the base station AP2 alone has the directional antenna, only the influences of interference from the base station AP2 on an identical channel can be reduced, however, by the base station AP1 also using a directional antenna, the influences of interference from the base station AP1 on an identical channel can also be reduced, and communication capacity can be further expanded.

Especially, when this embodiment is combined with the second embodiment, collision of radio signals, which may occur when NAV is not set, can be further reduced.

Upon determining the weighting factors of the directional antenna, the base station AP1 may indirectly acquire the position information of the base station AP2 from frames exchanged between the base stations, as in the above description of the third embodiment.

The base station AP2 having the directional antenna according to the third embodiment may communicate with another base station using the directive beam directed toward the partner base station, and may communicate with terminals by canceling the directivity (i.e. by using an omnidirectional beam).

For example, as shown in FIG. 14, the base station AP2 receives a beacon frame from the base station AP1, and sets weighting factors for directing the beam of the directional antenna toward the base station AP1, via the authentication process with the base station AP1. As shown in FIG. 10, when the terminal STA21 in the second BSS transmits a data frame which includes the MAC address of the terminal STA11 in the first BSS as the DA (destination address), the base station AP2 communicates with the terminal STA21 using an omnidirectional beam in steps S351 to S354 in FIG. 10, and communicates with the base station AP1 using the directive beam in step S355 in FIG. 10.

When the base station AP1 transmits a frame addressed to the terminal STA21 in the second BSS via the base station AP2, the base station AP2 directs the beam of the directional antenna toward the base station AP1, and receives a predetermined number of data frames from the base station AP1. After that, the base station AP2 cancels the directivity toward the base station AP1 (by setting uniform weighting factors), and then transmits that received frames to the terminal STA21 by using omnidirectional beam.

Note that the final destination (DA) of frames to be transmitted from the base station AP1 may be a plurality of terminals including the base station AP2.

When the base station AP2 determines that data frames to be received still remain after it has received a predetermined number of data frames transmitted from the base station AP1, it directs the beam of the directional antenna toward the base station AP1 again, and receives those data frames.

The base station AP2 determines that data frames to be received of those to be transmitted from the base station AP1 still remain, for example, when transmission from the base station AP1 is detected when the base station AP2 sets the antenna to be omnidirectional, or when the base station AP2 receives a message indicating the presence of remaining frames in the last frame upon receiving a predetermined number of data frames. Even when the base station AP2 cannot detect the presence of (remaining) data frames to be received, it may direct the beam of the directional antenna toward the base station AP1 again after an elapse of a predetermined period of time, and can receive data frames transmitted by a re-send process from the base station AP1.

The base station AP2 can communicate with the terminals STA21 and STA22 in the second BSS by canceling the directionality of the antenna beam directed toward the base station AP1 to set omnidirectionality.

Upon communicating with the base station AP1, the base station AP2 may cancel directionality of the directional antenna directed toward the base station AP1 to set omnidirectionality during a time interval in which the base station AP1 transmits beacon frames.

The base station AP2 receives an RTS frame or the like as one of control frames specified by IEEE802.11 (including IEEE802.11a and IEEE802.11b) from the base station AP1 while it sets the antenna 2 to be omnidirectional. When the base station AP2 determines that data frames are transmitted from the base station AP1, it directs the beam of the antenna 2 toward the base station AP1 to receive the frames, and returns a response as needed.

With this method, the base station AP2 does not assign a beam of the antenna 2 to the base station AP2 to receive beacon frames from the base station AP1 while data need not be exchanged with the base station AP1 after authentication. Therefore, the beam can be assigned to communications with the terminals STA21 and STA22 in the second BSS to which the base station AP2 belongs, and wireless resources can be efficiently used in communications.

Upon exchanging data frames, the communication quality of which must be improved, with the base station AP1, the base station AP2 directs the beam of the antenna 2 toward the base station AP1 again to meet a high communication quality requirement.

FOURTH EMBODIMENT

The fourth embodiment will explain a case wherein the base station AP2 has an adaptive array antenna. That is, a case will be described wherein the base station AP2 simultaneously communicates with the partner base station AP1 and the terminals STA21 and STA22 in the second BSS in a single channel using beams of a plurality of antennas. Communications between the base station AP2, and the base station AP1 and terminals STA21 and STA22 are made based on SDMA (Space Division Multiple Access). Note that this embodiment may use the method described in the first or second embodiment as the process for making the base station AP1 recognize the base station AP2 as a base station.

[Overall Arrangement]

Figure 15:
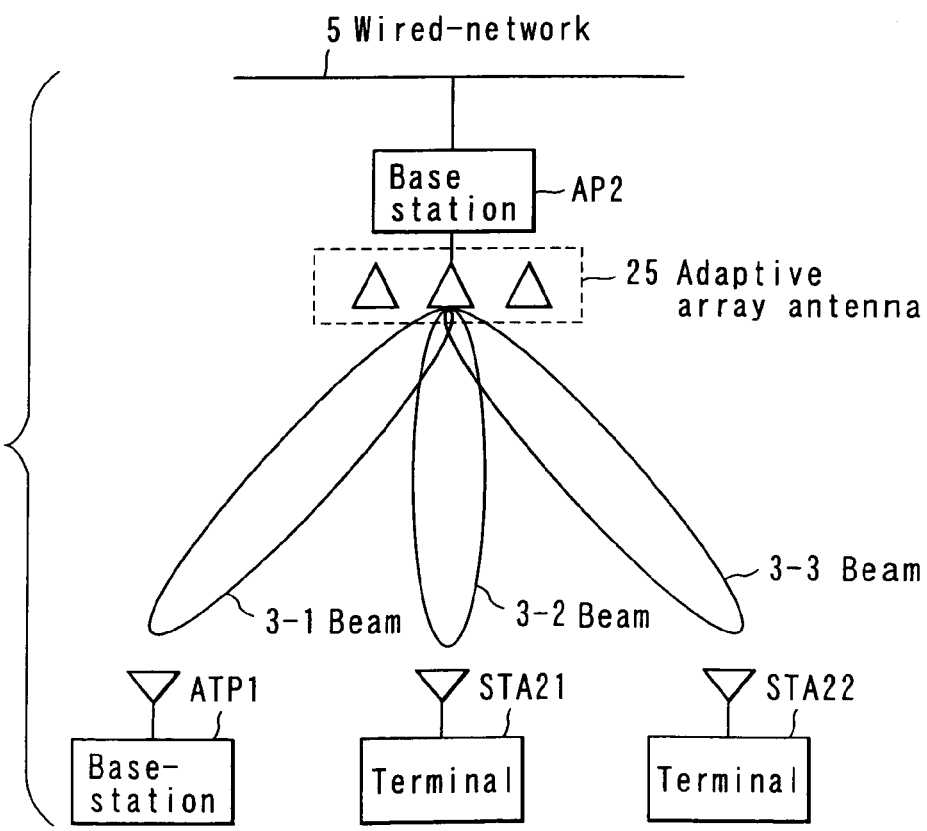
FIG. 15 is a diagram showing an example of the arrangement of principal part of a wireless LAN system according to the fourth embodiment of the present invention.

FIG. 15 shows a wireless communication system according to the fourth embodiment, and the same reference numerals denote the same parts as those in FIGS. 1 and 12. The base station AP2 comprises an adaptive array antenna 25. The adaptive array antenna 25 forms a plurality of relatively narrow directive patterns (to be referred to as directive beams or antenna beams hereinafter) 3-1 to 3-3. As shown in FIG. 15, the base station AP2 may be set at a specific fixed position, and may be connected to the wired network 5.

With such antenna beams 3-1 to 3-3, the base station AP2 can simultaneously communicate with a plurality of terminals (for example, terminals STA21 and STA22 in this case) and another base station AP1 in a single channel. That is, communications between the base station AP2, and the terminals STA21 and STA22 and base station Ap1 are made based on SDMA. Note that this embodiment will exemplify a case wherein the base station AP2 forms three antenna beams 3-1 to 3-3, and simultaneously communicates with the two terminals. STA21 and STA22 and the base station AP1, but the number of antenna beams, and the number of terminals which are to undergo simultaneous communications may be an arbitrary value equal to or larger than 2. The terminals STA21 and. STA22 are normally set at fixed positions, but may be movable bodies or may be mounted on movable bodies.

[About Base Station Apparatus]

The arrangement of the base station AP2 according to this embodiment will be explained below using FIG. 16.

Receivers 11-1 to 11-3 respectively receive signals transmitted from other terminals (for example, the terminals STA21 and STA22), and base station AP1 via antenna beams 3-1 to 3-3 of the adaptive array antenna 25. The receivers 11-1 to 11-3 execute processes including demodulation and decoding for the received signals to generate received signals RS1 to RS3.

On the other hand, transmitters 12-1 to 12-3 respectively generate transmitting signals TS1 to TS3 to be transmitted to the terminals STA21 and STA22, and base station AP1, and supplies these transmitting signals TS1 to TS3 to the adaptive array antenna 25. The transmitting signals TS1 to TS3 are respectively transmitted to the terminals STA21 and STA22, and base station AP1 via the antenna beams 3-1 to 3-3 of the adaptive array antenna 25.

The received signals RS1 to RS3 output from the receivers 11-1 to 11-3 are input to a receiving control unit 13 and undergo predetermined receiving processes.

A transmitting control unit 14 executes a transmitting process including generation of a packet or a frame to be broadcasted or unicasted to the terminals STA21 and STA22, and base station AP1. The packet or frame generated by the transmitting control unit 14 are transmitted to the terminals STA21 and STA22, and base station AP1 as transmitting signals TS1 to TS3 via the transmitters 12-1 to 12-3.

[About Adaptive Array Antenna]

An example of the detailed arrangement of the adaptive array antenna 25 will be described below using FIG. 17.

Figure 17:
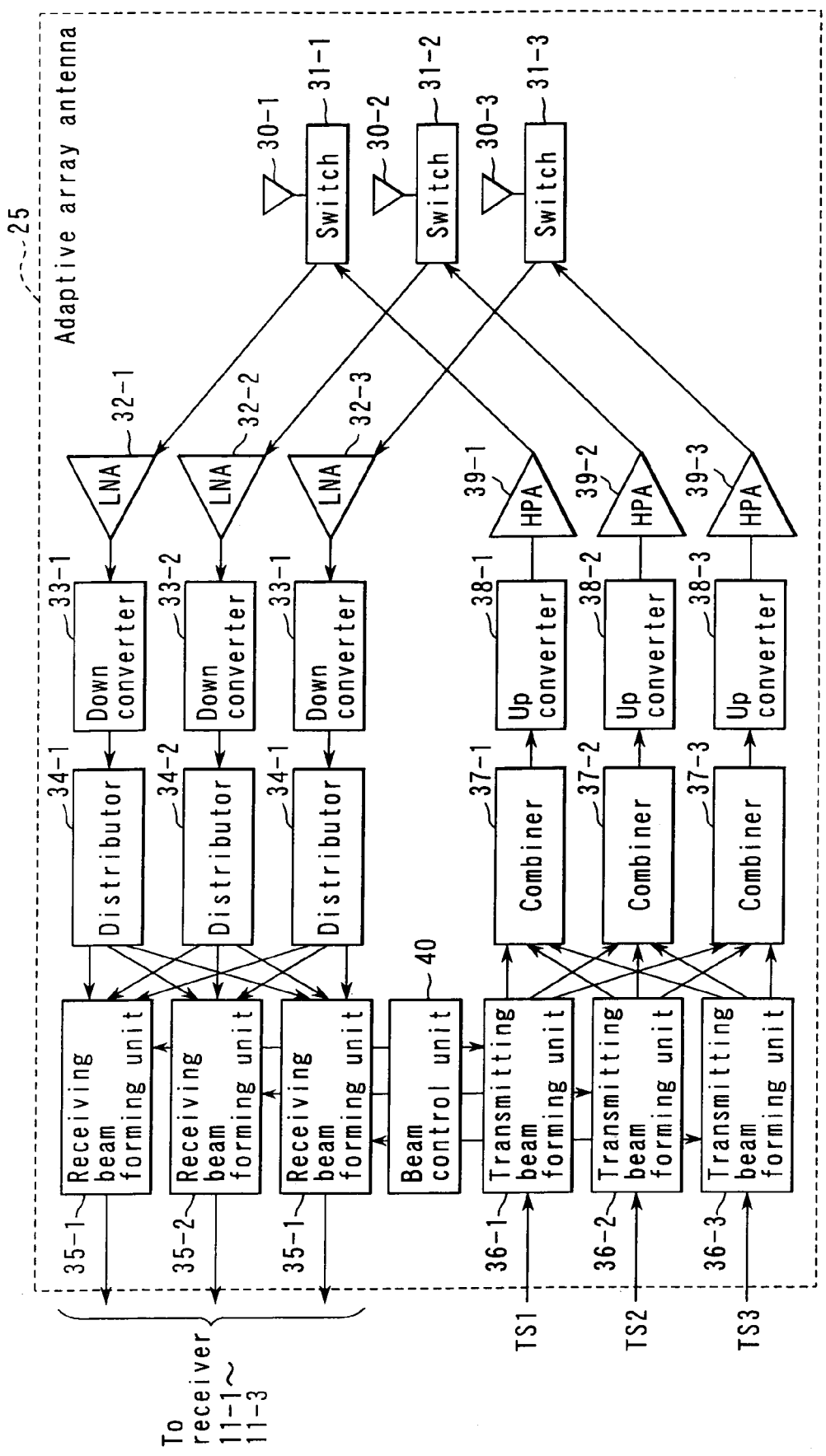
FIG. 17 is a block diagram showing an example of the arrangement of an adaptive array antenna.

As shown in FIG. 17, the adaptive array antennas 25 comprises antenna elements 30-1 to 30-3, transmission/reception switches 31-1 to 31-3, low-noise amplifiers (LNAs) 32-1 to 32-3, down converters 33-1 to 33-3, distributors 34-1 to 34-3, receiving beam forming units 35-1 to 35-3, transmitting beam forming units 36-1 to 36-3, combiners 37-1 to 37-3, up converters 38-1 to 38-3, high-frequency power amplifier (HPAs) 39-1 to 39-3, and beam controller 40.

The transmission/reception switches 31-1 to 31-3, LNAs 32-1 to 32-3, down converters 33-1 to 33-3 distributors 34-1 to 34-3, combiners 37-1 to 37-3, up converters 38-1 to 38-3, and HPAs 39-1 to 39-3 are arranged as many as the antenna elements 30-1 to 30-3 (three elements in this example) in correspondence with the antenna elements 30-1 to 30-3. On the other hand, receiving beam forming units 35-1 to 35-3 and transmitting beam forming units 36-1 to 36-3 are arranged as many as the antenna to be formed by the adaptive array antenna 35 (three beams in this example). The number of antenna beams can be either smaller or larger than the number of antenna elements 30-1 to 30-3.

The operation of the adaptive array antenna 25 will be described below. RF signals received by the antenna elements 30-1 to 30-3 are respectively input to the LNAs 32-1 to 32-3 via the transmission/reception switches 31-1 to 31-3, and are amplified to a predetermined level. The RF signals amplified by the LNAs 32-1 to 32-3 are respectively input to the down converters 33-1 to 33-3, each of which converts the frequency band of the RF signal from the radio frequency (RF) into the intermediate frequency (IF) or baseband (BB), and are then input to the distributors 34-1 to 34-3.

The distributor 34-1 distributes the output signal from the down converter 33-1 to the receiving beam forming units 35-1 to 35-3. The distributor 34-2 distributes the output signal from the down converter 33-2 to the receiving beam forming units 35-1 to 35-3. The distributor 34-3 distributes the output signal from the down converter 33-3 to the receiving beam forming units 35-1 to 35-3.

The receiving beam forming units 35-1 to 35-3 weight and combine the input signals in accordance with receiving complex weighting factors set by the beam controller 40, thus forming a plurality of receiving antenna beams. Signals corresponding to the receiving antenna beams from the receiving beam forming units 35-1 to 35-3 are respectively supplied to the receivers 11-1 to 11-3 in FIG. 16.

Figure 16:
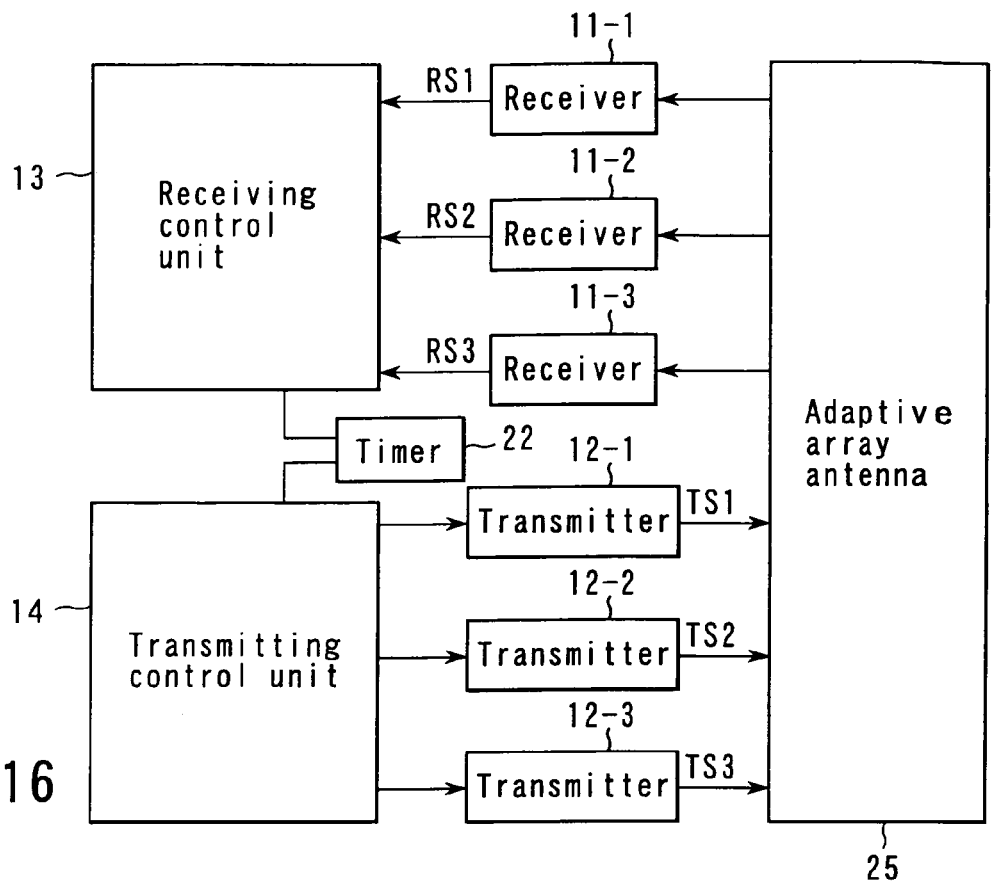
FIG. 16 is a block diagram showing an example of the arrangement of a base station apparatus.

On the other hand, the transmitting beam forming units 36-1 to 36-3 respectively receive transmitting signals TS1 to TS3 from the transmitters 12-1 to 12-3 in FIG. 16. The transmitting beam forming units 36-1 to 36-3 respectively multiply the input transmitting signals by a plurality of transmitting complex weighting factors set by the beam controller 40.

A plurality of output signals from the transmitting beam forming unit 36-1 are input to the combiners 37-1 to 37-3, and those from the transmitting beam forming units 36-1 and 36-2 are also input to the combiners 37-1 to 37-3. Each of the combiners 37-1 to 37-3 combines the plurality of input signals into one signal.

The output signals from the combiners 37-1 to 37-3 are respectively input to the up converters 38-1 to 38-3, each of which converts the frequency band of the signal from the intermediate frequency (IF) or baseband (BB) into the radio frequency (RF), and the converted signals are output to the HPAs 39-1 to 39-3. The transmitting signals amplified by the HPAs 39-1 to 39-3 are respectively supplied to the antenna elements 30-1 to 30-3 via the switches 31-1 to 31-3, and are transmitted to the terminals and base station.

The beam controller 40 sets receiving complex weighting factors in the receiving beam forming units 35-1 to 35-3, and sets transmitting complex weighting factors in the transmitting beam forming units 36-1 to 36-3. In such case, the beam controller 40 sets weighting factors used to communicate with an identical terminal in corresponding transmitting and receiving beam forming units (e.g., the receiving beam forming unit 35-1 and transmitting beam forming unit 36-3).

In the following description, a case will be exemplified wherein the base station AP2 has an adaptive array antenna. Also, the same applies to a case wherein the base station AP1 has an adaptive array antenna. Or both the base stations AP1 and AP2 may have adaptive array antennas.

The base station AP2 according to the fourth embodiment forms directive beams, which are respectively assigned to another base station (e.g., the base station AP1), and the terminals STA21 and STA22, using the adaptive array antenna 25, and communicates with them. As a result, on the terminal side, the opportunity of receiving signals directed from the base station AP2 to terminals other than the self terminal is reduced. Hence, interference can be reduced, and the number of terminals which can establish wireless connection to the base station AP2, i.e., the communication capacity in the BSS of the base station AP2, can be increased.

Note that a directive beam may be assigned to each group of a plurality of terminals. In such case, the arrangement and control of the adaptive array antenna in the base station AP2 can be facilitated while obtaining nearly the same effect as that obtained upon assigning beams to all terminals.

Upon communicating wirelessly with the base station AP1, the base station AP2 may check the presence/absence of directive beam control of the base station AP1 on the basis of the transmitting power upon transmitting frame from the base station AP1, the received power measured upon receiving frame transmitted from the base station AP1, and the type of received frame, and may adjust transmitting power upon transmitting frame to the base station AP1 on the basis of the checking result.

Or upon communicating wirelessly with the base station AP1, the base station AP2 may check the presence/absence of directive beam control of the base station AP1 on the basis of the received power measured upon receiving frame transmitted from the base station AP1, and the type of received frame, and may adjust transmitting power upon transmitting frame to the base station AP1 on the basis of the checked result.

In a wireless LAN system that uses CSMA and is based on IEEE802.11 (including IEEE802.11a and IEEE802.11b), a terminal makes carrier sense before frame transmission to a base station to which the terminal is to transmit the frame (data). Carrier sense includes a Physical Carrier Sense Mechanism for checking based on the received signal level if a wireless communication medium is busy or idle, and a Virtual Carrier Sense Mechanism for estimating based on reservation information included in a received signal.

If it is determined based on this carrier sense that the received level of a signal from another terminal to still another terminal including a base station is larger than a given threshold value, or if a frame including channel reservation information is received from another terminal, the terminal postpones frame transmission. If a wireless communication medium becomes idle after an elapse of a random transmission wait time, the terminal starts connection with a base station or terminal, or transmits a frame in which the address of a base station or another terminal is designated as the destination when connection has already been established.

On the other hand, according to SDMA, when an adaptive array antenna equipped in a base station apparatus forms a plurality of antenna beams that can reduce mutual interference, the communication quality can be improved, and simultaneously communications between the base station apparatus and a plurality of terminal apparatuses can be implemented. A wireless LAN system based on CSMA can also enjoy such merits by applying SDMA.

However, when SDMA is simply applied to the wireless LAN system based on CSMA, the following problem is posed.

In general, it is assumed that a terminal does not have any directional antenna such as an adaptive array antenna, because the arrangement and control of which are complex. Hence, when frame transmission is made between base stations, another terminal determines by the carrier sense function that the wireless communication medium is busy, and waits frame (packet) transmission. For this reason, even when the base station comprises an adaptive array antenna, communications that exploit SDMA in which another base station and a plurality of terminals simultaneously communicate with each other using a single channel cannot be efficiently made in a wireless communication system that adopts CSMA.

To solve this problem, when at least one of transmitting power control and carrier sense level control is done in wireless communications between base stations, the number of multiple accesses can be increased and, hence, the transmission efficiency upon adopting SDMA can be improved.

Figure 18:
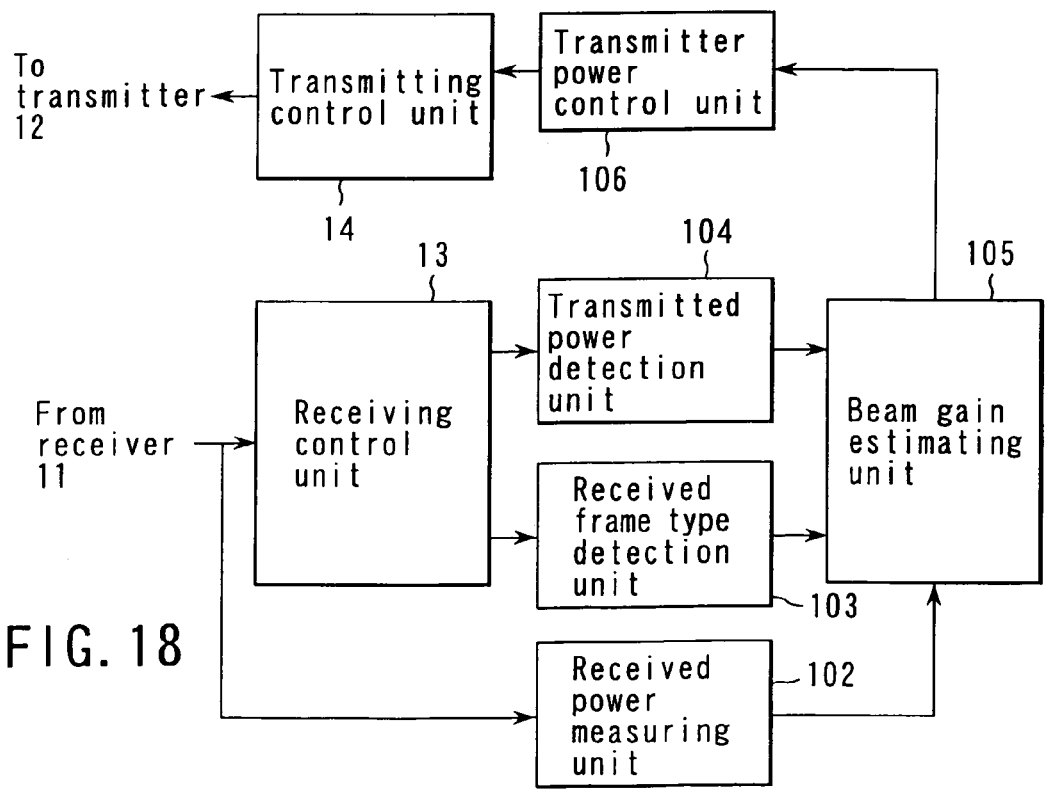
FIG. 18 is a block diagram showing an example of the arrangement of principal part of a base station apparatus that makes transmitter power control.

FIG. 18 shows an example of the arrangement of principal part of the base station AP2, which implements a function of adjusting transmitting power upon transmitting frame from the base station AP2 toward the base station AP1. Of course, the base station AP1 may execute transmitting power control as in the base station AP2 using the arrangement shown in FIG. 18. The following explanation will be given while taking the base station AP2 as an example, but the same applies to the base station AP1.

A case will be explained below wherein the base station AP1 has an adaptive array antenna, and the base station AP2 has a function of adjusting transmitting power. However, the present invention is not limited to such specific example, and the base station AP2 may have an adaptive array antenna, and the base station AP1 may have a function of adjusting transmitting power. Or both the base stations AP1 and AP2 may have adaptive array antennas, and the function of adjusting transmitting power.

The base station AP which has the adaptive array antenna transmits beacon frames by transmitting power that a plurality of terminals STAs around that base station AP can receive, at given time intervals. The beacon frames are transmitted using an omnidirective pattern since they must be transmitted to another base station AP and all terminals STAs and, hence, are broadcasted. On the other hand, since frames in authentication and association processes must be individually exchanged with another base station AP or each terminal STA, i.e., must be unicasted, a directive beam is used.

Hence, focusing attention on this feature, upon receiving frame from the base station AP1, the base station AP2 checks the type of received frame first. That is, it is identified if the received frame is a frame transmitted using an omnidirective pattern (or a omnidirective beam) (for example, a beacon frame specified by IEEE802.11 (including IEEE802.11a and IEEE802.11b)) or a frame transmitted by forming a directive beam if the base station AP1 can form it (for example, an authentication frame, association frame, or the like specified by IEEE802.11 (including IEEE802.11a and IEEE802.11b)). Then, the base station AP2 estimates the gain of a directive beam upon unicasting a frame addressed to the base station AP2 from the base station AP1 using transmitting power information of frame such as a beacon frame, which is transmitted using an omnidirective beam, transmitting power information of frame such as an authentication or association frame, which is transmitted by forming a directive beam if the base station AP1 can form it, and received power upon receiving such two types of frames in practice.

It is then determined based on that estimation result if the base station AP1 forms a directive beam to the base station AP2 (the presence/absence of directive beam control), in other words, the base station AP1 is making SDMA (Space Division Multiple Access) with respect to the base station AP2. If it is determined that the base station AP1 is making SDMA, the base station AP2 adjusts transmitting power of frame addressed to the base station AP1.

As shown in FIG. 18, the base station AP2 comprises a received power measuring unit 102, received frame type detection unit 103, transmitted power detection unit 104, beam gain estimating unit 105, and transmitter power control unit 106, in addition to the arrangement shown in FIGS. 3 and 16.

The received power measuring unit 102 measures electric power (received power) induced at the antenna 20 upon receiving frame data by the receiving control unit 13. Note that the directional antenna or adaptive array antenna 25 may replace the antenna 20.

The received frame type detection unit 103 determines based on information such as "type", "subtype", and the like in a MAC frame obtained by the receiving control unit 13 if that MAC frame is broadcasted or unicasted.

That is, the unit 103 determines based on "type" and "subtype" in the MAC frame if that MAC frame is a beacon frame (broadcasted frame) or authentication or association frame (unicasted frame).

Note that the received frame type detection unit 103 can also determine based on the destination address "DA" in a MAC frame obtained by the receiving control unit 13 if that MAC frame is broadcasted or unicasted. However, in this embodiment, the former case will be exemplified.

The transmitted power detection unit 104 extracts, from a MAC frame obtained by the receiving control unit 13, information (transmitting power information) associated with transmitting power upon transmitting that MAC frame from the base station AP1. The transmitting power information may be a power value itself, but may be a relative value (e.g., a level value) with reference to a predetermined value. That is, the base station AP2 can determine a variation of transmitting power on the basis of this information. Assume that the transmitting power information is stored at a predetermined position in the MAC frame. For example, this information is preferably presented using an undefined (reserved) field in "frame body" in the IEEE802.11 (including IEEE802.11a and IEEE802.11b) standard. However, the present invention is not limited to such a specific example, and the transmitting power information may be presented using an undefined field which is not used in the MAC frame upon operation of the wireless communication system.

For example, the transmitting power information may be expressed using one or a plurality of undefined status codes in a status code field in "frame body" in case of an authentication frame.

In this example, the base station AP2 estimates the gain of a directive beam upon unicasting a frame addressed to the base station AP2 from the base station AP1 using transmitting power information of frame which is transmitted by forming a directive beam if the base station AP1 can form it, and received power upon receiving such frame in practice. However, the present invention is not limited to such specific example. For example, the base station AP2 estimates the gain of a directive beam upon unicasting a frame addressed to the base station AP2 from the base station AP1 using received power upon receiving such frame without using any transmitting power information of frame which is transmitted by forming a directive beam if the base station AP1 can form it. However, when the transmitting power information is used as in the former case, the reliability of the estimated (calculated) gain can be improved. When no transmitting power information is used as in the latter case, the transmitted power detection unit 104 in FIG. 18 may be omitted.

Alternatively, transmitting power values of various MAC frames may be determined in advance, and may be pre-stored in the transmitted power detection unit 104 in correspondence with the types of MAC frames such as beacon, authentication, association, and the like. In such case, when the received frame type detection unit 103 detects the type of received MAC frame, the transmitted power detection unit 104 reads out transmitting power corresponding to that type.

The beam gain estimating unit 105 estimates the gain (directive gain) of a directive beam of data received by the receiving control unit 13 on the basis of the type of a received frame detected by the received frame type detection unit 103 (a broadcasted frame (e.g., a beacon frame) or a unicasted frame (e.g., an authentication or association frame)), the received power measured by the received power measuring unit 102, and the transmitting power information of that received frame obtained by the transmitted power detection unit 104. Based on the estimated directive gain, the presence/absence of directive beam control of the base station AP1 is determined, and if the directive gain value (level) is equal to or higher than a predetermined level, it is determined that the base station AP1 is implementing SDMA.

When the beam gain estimating unit 105 determines that the base station AP1 is implementing SDMA, the transmitter power control unit 106 lowers transmitter power of frame addressed to the base station AP1 by, e.g., a predetermined level. The transmitting power of frame addressed to the base station AP1 is preferably the smallest possible transmitting power within the receivable range at the base station AP1, i.e., the minimum required transmitting power. Note that the circuit itself for implementing transmitter power control is known to those who are skilled in the art.

Figure 19:
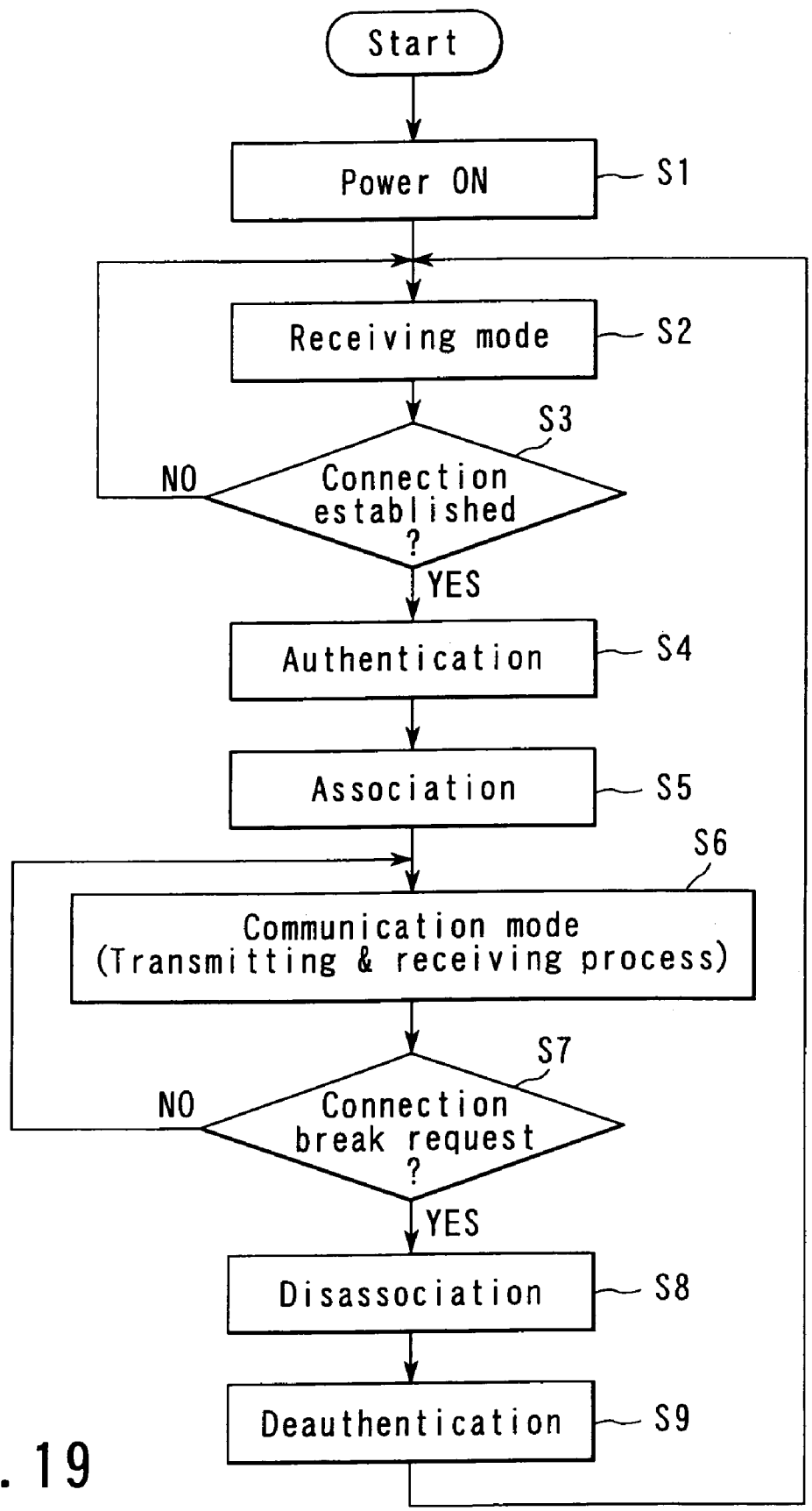
FIG. 19 is a flow chart for explaining the processing operation of the base station apparatus.

FIG. 19 is a flow chart for explaining the processing operation of the base station AP2.

Referring to FIG. 19, if the power supply is turned on (step S1), the base station AP2 is set in a receiving mode, and is ready for communications by establishing connection in response to a request from, e.g., the base station AP1 or terminal STA (step S2).

Assume that a data transmission request is generated at the base station AP2 (by, e.g., user's operation) in the receiving mode, and a connection request for connecting the self station to the base station AP1 is generated (step S3). In such cases, authentication and association processes are executed between the base stations AP2 and AP1 (steps S4 and S5). Note that authentication and association comply with IEEE802.11 (including IEEE802.11a and IEEE802.11b).

If authentication and association have succeeded and connection between the base stations AP2 and AP1 is established, the base station AP2 can communicate with the base station AP1 via this connection. That is, the base station AP2 is set in a communication mode (step S6).

Note that authentication and association need only be done once between apparatuses which must establish wireless connection (need not be done every time a data frame is transmitted).

Upon breaking wireless connection with the base station AP1, the base station breaks the established connection via disassociation and deauthentication processes (steps S8 and S9), and goes to the receiving mode again (step S2).

In FIG. 19, the processes executed upon establishing/breaking connection between the base stations AP1 and AP2 have been exemplified. The same applies to processes executed upon establishing/breaking connection between the terminal STA and the base station AP2.

Note that disassociation and deauthentication comply with IEEE802.11 (including IEEE802.11a and IEEE802.11b).

The transmitting power control procedure upon transmitting frames from the base station AP2 to the base station AP1 will be explained below with reference to FIG. 20.

The base station AP1 periodically transmits beacon frames (step S101). In principle, the base station AP2 can receive beacon frames not only in the receiving mode in step S2 in FIG. 19, i.e., but during authentication and association processes in steps S4 and S5, and disassociation and deauthentication processes in steps S8 and S9.

For example, in the base station AP2, if the received frame type detection unit 103 determines in the receiving mode that a frame received via the antenna 20, directional antenna 2, or adaptive array antenna 25 is a beacon frame, the beam gain estimating unit 105 receives at least received power of the beacon frame measured by the received power measuring unit 102. Note that the beam gain estimating unit 105 may receive transmitting power information from the beacon frame or from that stored in advance in correspondence with the beacon frame from the transmitted power detection unit 104 (step S102), so as to estimate the gain more accurately, as described above. Assume that the beam gain estimating unit receives the received power and transmitting power information.

Every time a beacon frame is received, the received power measured at that time and transmitting power information may be stored time-serially.

After that, assume that a transmission request is generated at the base station AP2 (step S3 in FIG. 19), and the control enters the authentication process in step S4 in FIG. 19. In this case, the transmitting control unit 14 of the base station AP2 transmits an authentication frame with ATSN=1 as a frame that starts an authentication request (and is addressed to the base station AP1) to the base station AP1 (step S103). In this case, if transmitting power, which was set by the transmitter power control unit 106 previously upon transmitting frame to the base station AP1, is available, the authentication frame with ATSN=1 is transmitted using that transmitting power. Otherwise, that frame may be transmitted with default transmitting power.

Note that ATSN is stored in "frame body" of the authentication frame.

Upon receiving the authentication frame with ATSN=1, the base station AP1 sets a directive beam to be directed to the base station AP2 on the basis of received power at that time and the like (step S104). That is, the base station AP1 sets the aforementioned weighting factors corresponding to a direction in which the base station AP2 is present.

The base station AP1 transmits an authentication frame with ATSN=2 (response to the authentication frame with ATSN=1) to the base station AP2 using the set directive beam (step S105).

The authentication frame with ATSN=2 may contain transmitting power information, as described above.

If the received frame type detection unit 103 determines that a frame received via the antenna is an authentication frame with ATSN=2, the beam gain estimating unit 105 receives at least the received power of that frame measured by the received power measuring unit 102. Furthermore, the beam gain estimating unit 105 may receive transmitting power information, which is extracted from that frame or is pre-stored in correspondence with the authentication frame with ATSN=2, from the transmitted power detection unit 104 (step S106). Assume that the beam gain estimating unit 105 receives the received power and transmitting power information.

Figure 20:
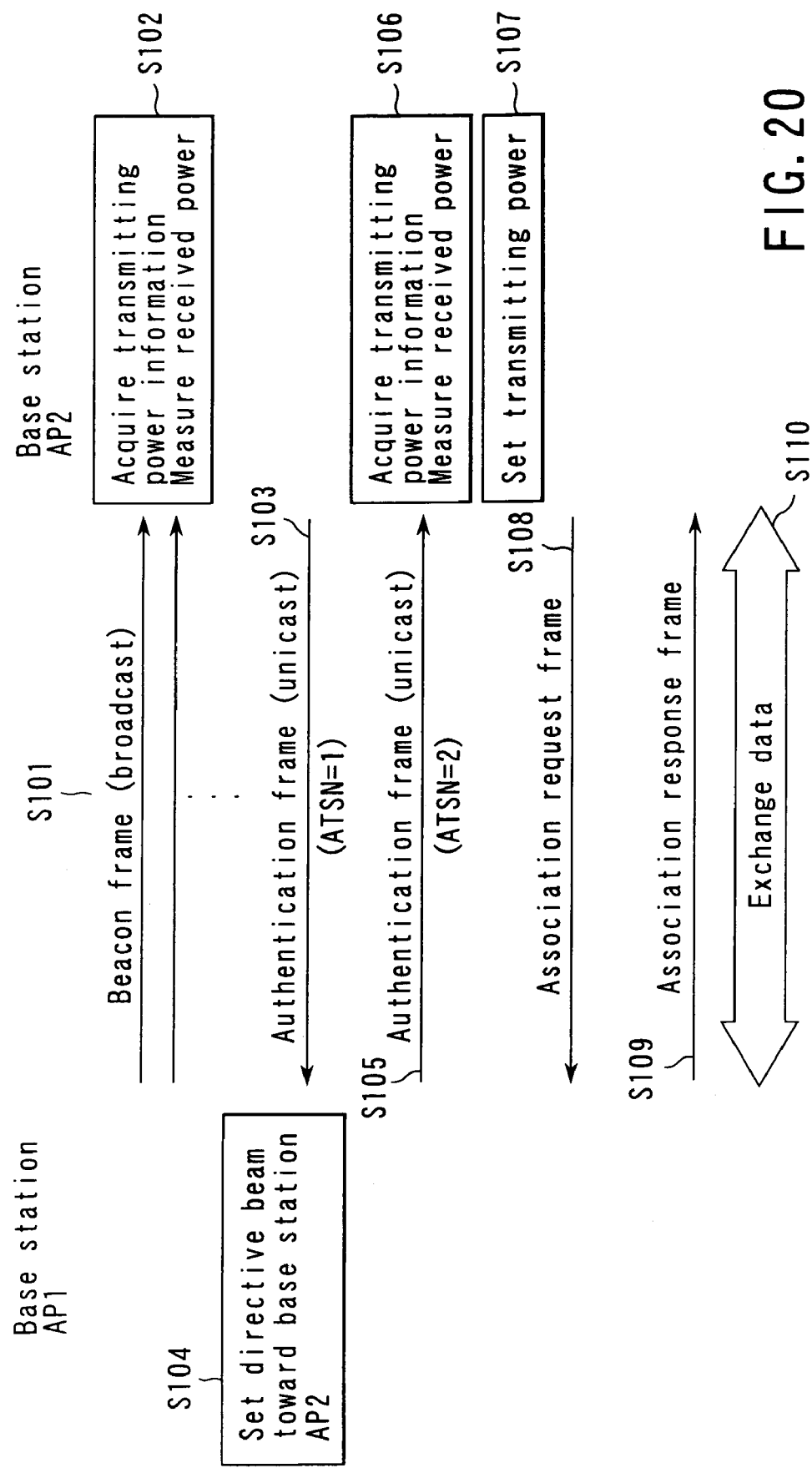
FIG. 20 is a chart for explaining the transmitter power control procedure upon exchanging data between base stations.
Figure 21:
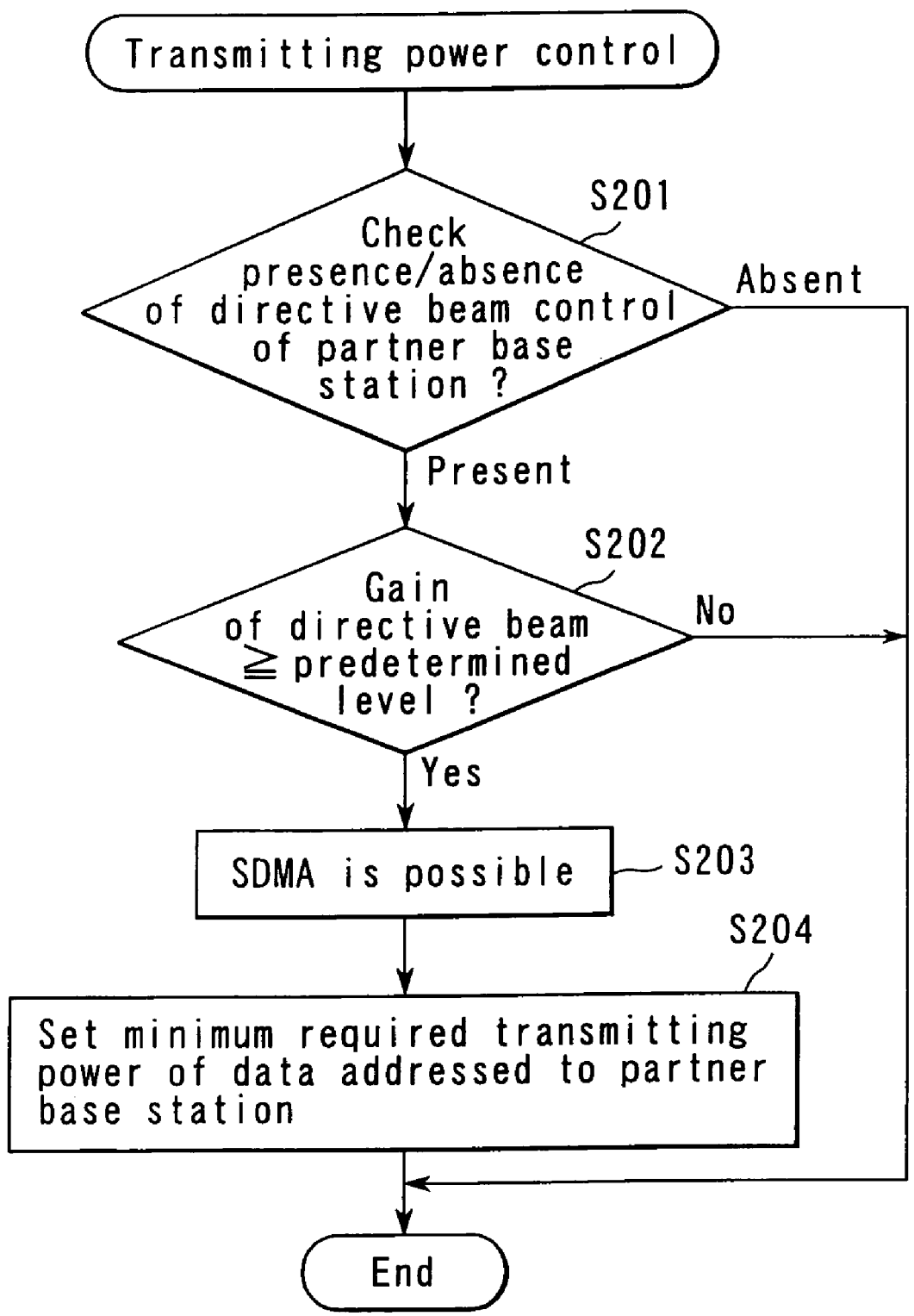
FIG. 21 is a flow chart for explaining the transmitter power control procedure of the base station.

At this time, the beam gain estimating unit 105 and transmitter power control unit 106 execute processes shown in FIG. 21 using the received power and transmitting power information of the received beacon frame obtained in step S102 in FIG. 20, and those of the authentication frame with ATSN=2 obtained in step S105, so as to adjust the transmitting power (step S107).

Referring to FIG. 21, the beam gain estimating unit 105 checks the presence/absence of directive beam control of the base station AP1 on the basis of the received power and transmitting power information of the received beacon frame obtained in step S102 in FIG. 20, and those of the authentication frame with ATSN=2 obtained in step S105 (step S201). That is, the presence/absence of directive beam control means whether or not the base station AP1 focuses directionality toward the base station AP2, i.e., whether or not an antenna beam is directed toward the base station AP2.

For example, assume that the transmitting power information of the beacon frame transmitted as an omnidirective pattern is "3", and its received power is "2". Also, assume that the transmitting power information of the authentication frame, which is assumed to have been transmitted using a directive beam, is "3", and its received power is "4". Note that these numerical values are not actual power values but levels corresponding to them. In this way, since the received power increases although the transmitting power of the base station AP1 remains "3", it is estimated that the base station AP1 executes directive beam control with a gain of, e.g., level 1.

Likewise, assume that the transmitting power information of the beacon frame is "3", and its received power is "2". Also, assume that the transmitting power information of the authentication frame is "4" and its received power is "4". In this manner, when the degree of change in transmitting power does not correspond to that in received power, e.g., when the transmitting power of the base station AP1 increases by "1" but the received power increases by "2", it is also estimated that the base station AP1 executes directive beam control with a gain of, e.g., level 1.

On the other hand, assume that transmitting power information of the beacon frame is "3", and its received power is "2". Also, assume that the transmitting power information of the authentication frame is "4" and its received power is "3". At this time, the received power increases by "1" in correspondence with the increment of "1" of the transmitting power of the base station AP1, i.e., the degree of change in transmitting power corresponds to that in received power. In such case, since the base station AP1 executes transmitter power control and the received power changes accordingly, it can be estimated that the base station AP1 does not execute directive beam control using a directional antenna.

Note that the presence/absence of directive beam control may be estimated on the basis of the reception results of two or more frames such as beacon frames transmitted using omnidirective pattern, and two or more frames such as authentication frames transmitted using directive pattern, thus further improving the estimation accuracy.

The base station AP2 checks the presence/absence of directive beam control of the base station AP1 on the basis of the received power and transmitting power information of the received beacon frame obtained in step S102, and those of the authentication frame with ATSN=2 obtained in step S105. Alternatively, the base station AP2 may execute such checking process using only the received power, as described above. However, using both the received power and transmitting power information allows more accurate estimation of the presence/absence of directive beam control of the base station AP1.

A case will be explained below wherein the beam gain estimating unit 105 of the base station AP2 checks the presence/absence of directive beam control of the base station AP1 without using any transmitting power information of the received beacon frame and authentication frame.

In such case, the base station AP1 transmits frames such as beacon frames, authentication frames, and the like using predetermined transmitting power (e.g., "3"). For example, assume that the received power of the received beacon frame obtained in step S102 in FIG. 20 is "2", and that of the authentication frame with ATSN=2 obtained in step S105 is "4". In such case, although the base station AP1 transmits these frames using identical transmitting power, the received power of a frame to be unicasted (authentication frame) is larger than that of a frame to be broadcasted. In such case, it is estimated that the base station AP1 executes directive beam control with a gain of, e.g., level 1.

If the base station AP2 determines in step S201 that the base station AP1 executes directive beam control, the flow advances to step S202. The base station AP2 checks in step S202 if an antenna beam has directionality that has been sufficiently focused toward the base station AP2 by the base station AP1, and is strong enough to implement SDMA. That is, if the level of the estimated gain of the directive beam is equal to or higher than, e.g., a predetermined level (step S202), the beam gain estimating unit 105 determines that it is possible to implement SDMA.

For example, if the directive beam has a gain of level 1 or more, it is determined that the degree of focus of directionality in the base station AP1 is enough to allow the base station AP2 to execute SDMA (it is possible to implement SDMA).

However, step S202 is not always required, and may be omitted. In such case, if it is determined in step S201 that the base station AP1 executes directive beam control, the flow jumps to step S204 while skipping steps S202 and S203.

If the beam gain estimating unit 105 determines in step S203 that the base station AP2 can execute SDMA, as described above, the flow advances to step S204. In step S204, the transmitter power control unit 106 of the base station AP2 decreases the transmitting power of frame addressed to the base station AP1 by a predetermined level (it preferably sets minimum required transmitting power of frame addressed to the base station AP1). That is, the transmitting power of frame addressed to the base station AP1 is set to be a sufficiently small value within the receivable range of the base station AP1.

Referring back to FIG. 20, if the transmitter power control has been done according to FIG. 21 to set new transmitting power in step S107, the set transmitting power is used as that upon transmitting subsequent frame addressed to the base station AP1.

If authentication has succeeded, association is then executed according to the specifications of IEEE802.11. That is, if the transmitting power is set in step S107, the transmitting control unit 14 of the base station AP2 transmits an association request frame used to request start of association to the base station AP1 using the set transmitting power (step S108).

Upon normally receiving the association request frame, the base station AP1 transmits an association response frame to the base station AP2 as its response (step S109). If association has succeeded, an access control phase comes to an end, and data frames are exchanged with the base station AP1 (step S110) (corresponding to step S6 in FIG. 19).

A case will be explained below with reference to FIG. 22 wherein shared key authentication is made. Note that the same reference numerals denote the same steps as in FIG. 20, and only differences will be explained. In case of shared key authentication, after an authentication frame with ATSN=2 is received in step S105, the base station AP2 transmits an authentication frame with ATSN=3 to the base station AP1 (step S151). In such case, if transmitting power, which was set by the transmitter power control unit 106 previously upon transmitting frame to the base station AP1, is available, the authentication frame with ATSN=3 is transmitted using that transmitting power. If no such transmitting power previously set by the transmitter power control unit 106 is available, that frame may be transmitted with default transmitting power.

Upon receiving the authentication frame with ATSN=3, the base station AP1 re-sets a directive beam toward the base station AP2 on the basis of the received power at that time and the like (step S152). That is, the base station AP1 re-sets the weighting factors corresponding to a direction in which the base station AP2 is present.

The base station AP1 transmits an authentication frame with ATSN=4 to the base station AP2 using the set directive beam (step S153).

Note that the authentication frame with ATSN=4 may contain transmitting power information, as described above.

If the received frame type detection unit 103 determines that frame received via the antenna 20, directional antenna 2, or adaptive array antenna 25 is an authentication frame with ATSN=4, the beam gain estimating unit 105 receives the received power of that frame measured by the received power measuring unit 102, and transmitting power information, which is extracted from that frame or is pre-stored in correspondence with the authentication frame with ATSN=4, from the transmitted power detection unit 104 (step S154).

At this time, the beam gain estimating unit 105 and transmitter power control unit 106 execute the processes shown in FIG. 21 using the received power and transmitting power information of the received beacon frame obtained in step S102 in FIG. 20, and those of the authentication frame with ATSN=4 obtained in step S154, so as to set transmitting power (step S155).

Figure 22:
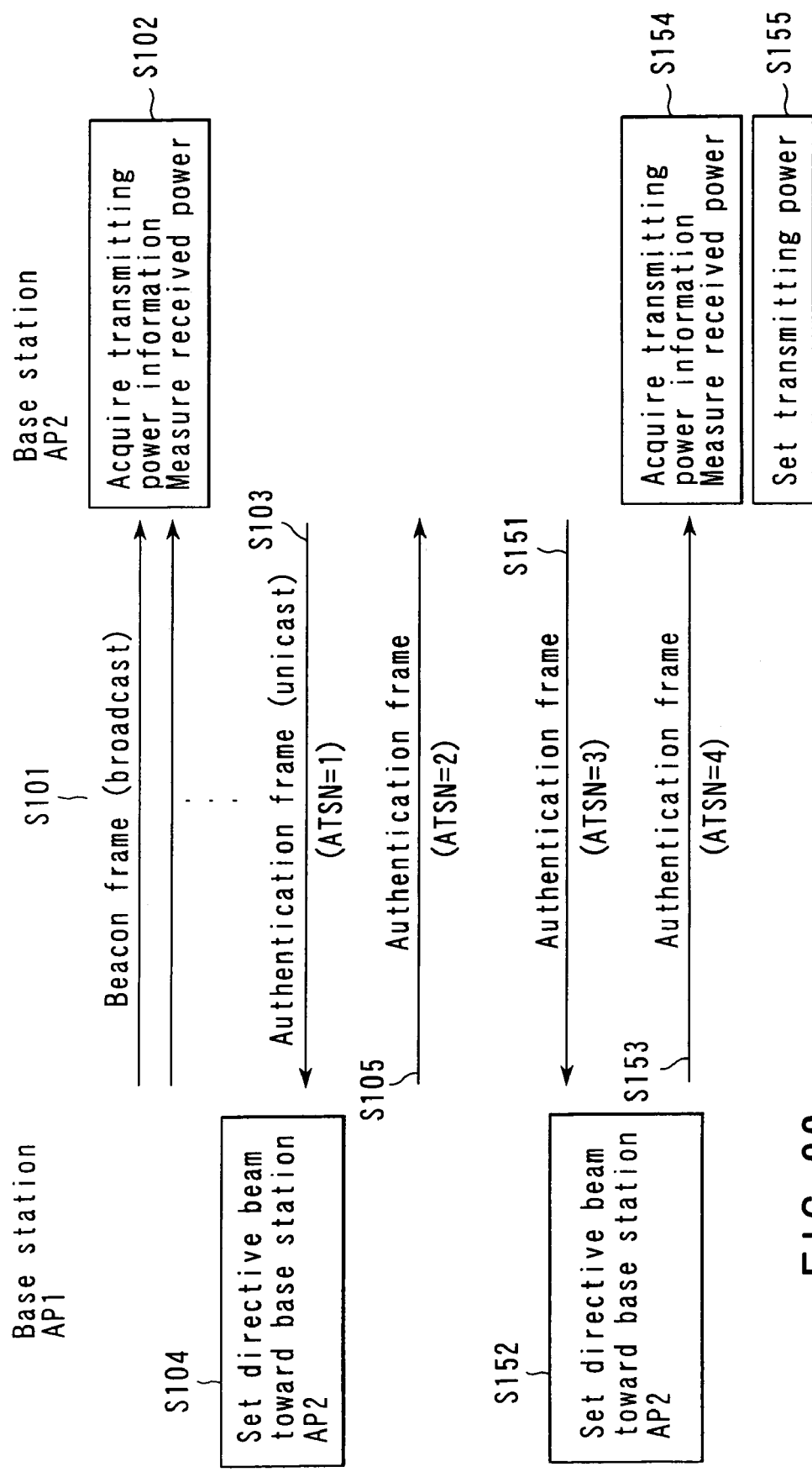
FIG. 22 is a chart for explaining the transmitter power control procedure upon exchanging data between base stations in case of making shared key authentication.

After step S105, the same processes as in steps S106 and S107 in FIG. 20 are executed, and using electric power set in the processes, authentication frame with ATSN=4 is transmitted in step S153 in FIG. 22, and is received Then, transmitting power may be re-set in steps S154 and S155.

The subsequent processing operations are the same as those in step S108 and subsequent steps in FIG. 20.

In FIG. 22, the base station AP2 checks the presence/absence of directive beam control of the base station AP1 on the basis of the received power and transmitting power information of the received beacon frame, and those of the authentication frame with ATSN=4 so as to set transmitting power in step S155. Alternatively, the base station AP2 may execute such checking process using only the received power values of the received beacon frame and authentication frame with ATSN=4, as described above. However, using both the received power and transmitting power information allows more accurate estimation of the presence/absence of directive beam control of the base station AP1.

A case will be explained below with reference to FIG. 23 wherein the base station AP2 executes transmitter power control not in authentication but in association. Note that the same reference numerals denote the same steps as in FIG. 20, and only differences will be explained. That is, after the authentication frame with ATSN=2 is received in step S105, the flow jumps to step S108 while skipping steps S106 and S107, and the base station AP2 transmits an association request frame used to request start of association to the base station AP1 (step S108). Upon normally receiving the association request frame, the base station AP1 transmits an association response frame to the base station AP2 as its response (step S109).

The association response frame may contain transmitting power information, as described above.

In the base station AP2, if the received frame type detection unit 103 determines that data received via the antenna 20, directional antenna 2, or adaptive array antenna 25 is an association response frame, the beam gain estimating unit 105 receives the received power of that frame measured by the received power measuring unit 102, and transmitting power information, which is extracted from that frame or is pre-stored in correspondence with the association response frame, from the transmitted power detection unit 104 (step S161).

At this time, the beam gain estimating unit 105 and transmitter power control unit 106 execute the processes shown in FIG. 21 using the received power and transmitting power information of the received beacon frame obtained in step S102, and those of the association response frame obtained in step S161, so as to set transmitting power (step S162).

If association has succeeded, the access control phase comes to an end, and data frames are exchanged with the base station AP1 (step S163) (corresponding to step S6 in FIG. 19).

Figure 23:
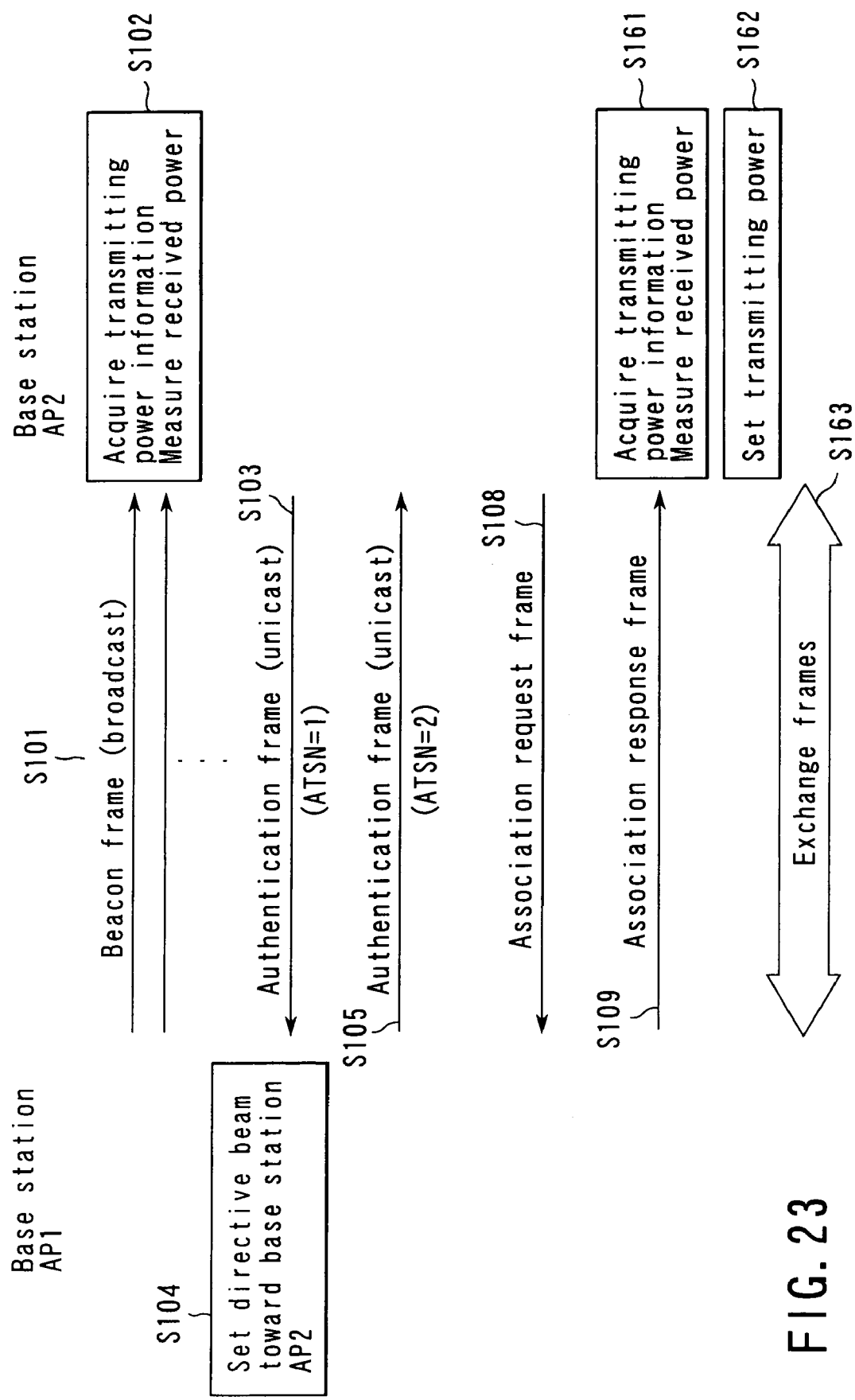
FIG. 23 is a chart for explaining the transmitter power control procedure upon exchanging data between base stations in case of making transmitter power control in association.

In FIG. 23, the base station AP2 checks the presence/absence of directive beam control of the base station AP1 on the basis of the received power and transmitting power information of the received beacon frame, and those of the association response frame so as to set transmitting power in step S162. Alternatively, the base station AP2 may execute such checking process using only the received power values of the received beacon frame and association response frame, as described above. However, using both the received power and transmitting power information allows more accurate estimation of the presence/absence of directive beam control of the base station AP1.

When the transmitting power is set in the procedure shown in FIG. 23, the setup processes of transmitting power using an authentication frame shown in steps S106 and S107 in FIG. 20 and steps S154 and S155 in FIG. 22 may be combined. In such a case, the transmitting power can be set more accurately.

As described above, according to the fourth embodiment, the base station AP2 checks if the base station AP1 executes directive beam control, on the basis of the received power upon receiving a frame broadcasted from the base station AP1 and that upon receiving a frame unicasted from the base station AP1. If it is determined that the directive beam control is executed, the base station AP2 may further check if the degree of focus of directionality is enough to implement SDMA. If it is determined that the base station AP1 executes directive beam control (with the degree of focus of directionality which is enough to implement SDMA), the base station AP2 re-sets minimum required transmitting power used upon transmitting subsequent frame to the base station AP1. Since the base station AP2 controls transmitting power upon transmitting frames to the base station AP1, transmission of frame (unicasted) from the base station AP2 to the base station AP1 can be prevented from interfering with communications of nearby terminals STAs.

Also, according to the fourth embodiment, the base station AP2 checks if the base station AP1 executes directive beam control, on the basis of the received power upon receiving frame broadcasted from the base station AP1 and transmitting power information corresponding to that received frame, and received power upon receiving frame unicasted from the base station AP1 and transmitting power information corresponding to that received frame. If it is determined that the directive beam control is executed, the base station AP2 may further check if the degree of focus of directionality is enough to implement SDMA. If it is determined that the base station AP1 executes directive beam control (with the degree of focus of directionality which is enough to implement SDMA), the base station AP2 re-sets minimum required transmitting power used upon transmitting subsequent frame to the base station AP1. Since the base station AP2 controls transmitting power upon transmitting frames to the base station AP1, transmission of frame (unicasted) from the base station AP2 to the base station AP1 can be prevented from interfering with communications of nearby terminals STAs.

Upon comparing cases with and without transmitter power control by the base station AP2, the former case assures sufficiently small received power of a transmitting signal from the base station AP2 to the base station AP1. For this reason, in the former case, the terminals STA21 and STA22 in the BSS to which the base station AP2 belongs detect less frequently upon carrier sense that a wireless medium is busy. That is, when each of the terminals STA21 and STA22 does not detect any received power of a signal transmitted from the base station AP2 to the base station AP1, it never sets the NAV specified by IEEE802.11 (if the NAV is set, the terminal waits access to the base station AP2 for a period of time designated by the NAV.

Therefore, the base station AP2 can implement SDMA with a plurality of terminals STAs, and the number of multiple accesses can be increased compared to a case wherein the base station AP2 does not execute the transmitter power control.

In the fourth embodiment, the base station AP2 checks if the base station AP1 executes directive beam control. However, the present invention is not limited to such specific case, and the base station may execute the same processes for the terminals (terminals STA21 and STA22).

The received frame type detection unit 103 of the fourth embodiment is used to identify if received frame is a frame which is assumed to be broadcasted using an omnidirective pattern if the base station AP1 (or terminal STA21 or STA22) executes directive beam control, or a frame which is assumed to be unicasted by forming a directive beam if the base station AP1 executes directive beam control. In this case, the received frame type detection unit 103 extracts information such as "type", "subtype", and the like in a MAC frame obtained by the receiving control unit 13, and identifies the type of received frame based on such information, i.e., if the received frame is a beacon frame to be broadcasted or an authentication/association frame to be unicasted.

In order to determine if the base station AP1 executes directive beam control, broadcasted or unicasted frame can be identified by checking the destination address in frame transmitted from the base station AP1 in addition to the aforementioned method. The received frame type detection unit 103 checks the destination address (DA) of the received frame (MAC frame shown in FIG. 6). If the destination address is a broadcast address, the unit 103 determines that the received frame is a broadcasted frame; if the destination address is an address of the self apparatus, the unit 103 determines that the received frame is a unicasted frame. In this way, whether the received frame is a broadcasted or unicasted frame can be identified.

FIFTH EMBODIMENT

In the description of the fourth embodiment, the base station AP2 executes transmitter power control. In the fifth embodiment, a case will be explained below wherein the base station AP2 controls the carrier sense level.

In this case, the processes are basically the same as in the fourth embodiment. That is, the base station AP2 checks if the base station AP1 executes directive beam control, on the basis of received power upon receiving frame broadcasted from the base station AP1 and transmitting power information of that received frame, and received power upon receiving frame unicasted from the base station AP1 and transmitting power information of that received frame. If it is determined that the directive beam control is done, the base station AP2 may further check if the degree of focus of directionality is enough to implement SDMA. If it is determined that the base station AP1 executes directive beam control (with the degree of focus of directionality which is enough to implement SDMA), the base station AP2 re-sets the carrier sense level of the self apparatus to increase it, thus adjusting to suppress the carrier sense sensitivity to the minimum required level.

In such case, the base station AP2 may check if the base station AP1 executes directive beam control, on the basis of received power upon receiving frame broadcasted from the base station AP1, and that upon receiving frame unicasted from the base station AP1, as in the fourth embodiment.

Figure 24:
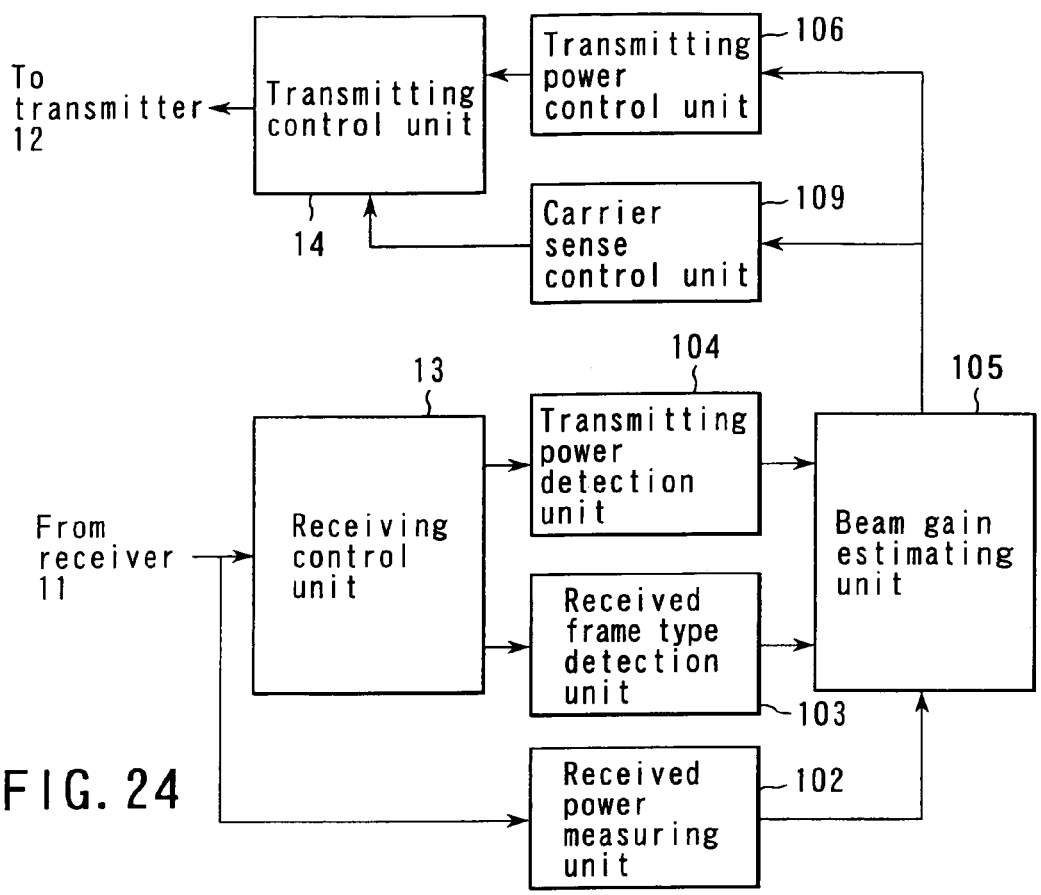
FIG. 24 is a block diagram showing an example of the arrangement of a base station apparatus that controls the carrier sense level.

FIG. 24 shows an example of the arrangement of principal part of the base station AP2 according to the fifth embodiment. The same reference numerals in FIG. 24 denote the same parts as in FIG. 18, and only differences will be explained. That is, in FIG. 24, a carrier sense control unit 109 is added. As in the fourth embodiment, the base station AP1 may have an adaptive array antenna, and may execute transmitting power control as in the base station AP2 with the arrangement shown in FIG. 24. The following explanation will be given while taking the base station AP2 as an example, but the same applies to the base station AP1.

When the beam gain estimating unit 105 determines that SDMA can be implemented, the carrier sense control unit 109 sets a high carrier sense level in CSMA of the self apparatus within a range in which the carrier sense function is effective, thus adjusting to suppress the carrier sense sensitivity. Note that the circuit for increasing/decreasing the carrier sense level is known to those who are skilled in the art.

The carrier sense level setting timing of the carrier sense control unit 109 is the same as the transmitter power control of the fourth embodiment. That is, the carrier sense control unit 109 sets the carrier sense level simultaneously with or in place of setting of transmitting power in step S107 in FIG. 20, step S155 in FIG. 22, or step S162 in FIG. 23.

Figure 25:
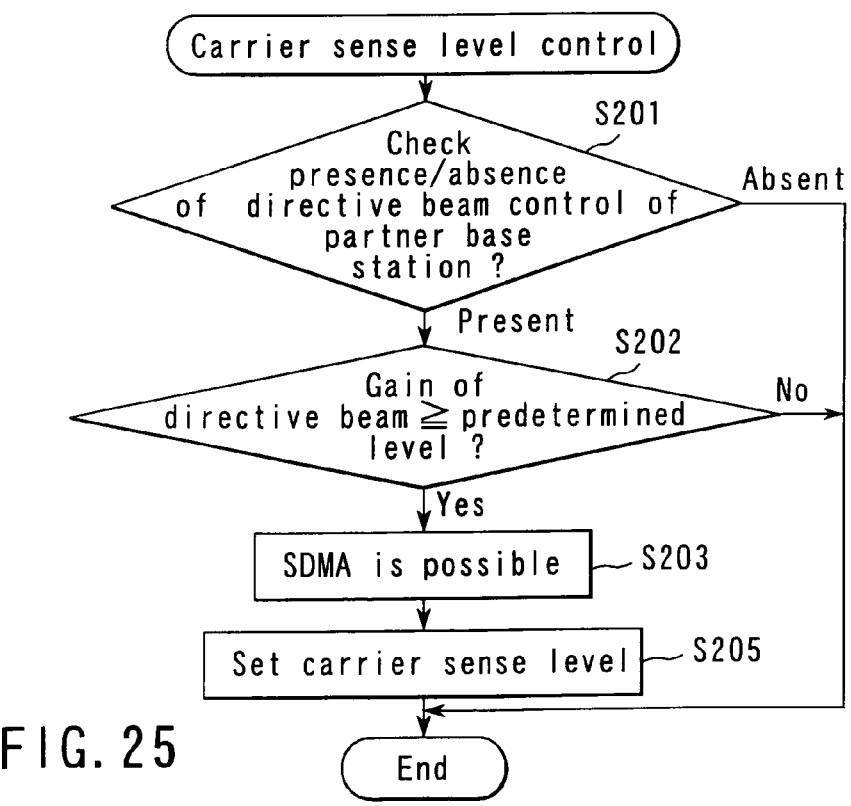
FIG. 25 is a flow chart for explaining the carrier sense level control procedure of the base station apparatus.

FIG. 25 is a flow chart for explaining the carrier sense level control procedure. Note that the same reference numerals denote the same steps as in FIG. 21, and only differences will be mainly explained.

Steps S201 to S203 in FIG. 25 are the same as those in FIG. 21. That is, the beam gain estimating unit 105 checks in step S106 in FIG. 20, step S154 in FIG. 22, or step S161 in FIG. 23 if the base station AP1 executes directive beam control, on the basis of received power upon receiving frame broadcasted from the base station AP1 and transmitting power information of that received frame, and received power upon receiving frame unicasted from the base station AP1 and transmitting power information of that received frame (step S201), as has been explained in FIG. 21. If it is determined that the directive beam control is executed, the beam gain estimating unit 105 further checks if the degree of focus of directionality in the base station AP1 is enough to implement SDMA (steps S202 and S203).

In FIG. 25 as well, whether or not the base station AP1 executes directive beam control may be checked based on received power upon receiving frame broadcasted from the base station AP1, and that upon receiving frame unicasted from the base station AP1 without using transmitting power information, as described above.

For example, if the level of the gain of the directive beam is equal to or higher than a predetermined level, it is determined that SDMA can be implemented (steps S201 to S203). As in the fourth embodiment, the checking processes in steps S202 and S203 may be skipped. In such case, if it is determined in step S201 that the base station AP1 executes directive beam control, the flow jumps to step S205 while skipping steps S202 and S203.

If the beam gain estimating unit 105 determines in step S203 that SDMA can be implemented, the carrier sense control unit 109 increases the carrier sense level of the self apparatus by, e.g., a predetermined level to suppress the carrier sense sensitivity (step S205). After that, carrier sense is done using the set carrier sense level.

As described above, according to the fifth embodiment, the base station AP2 checks if the base station AP1 executes directive beam control, on the basis of received power upon receiving a frame broadcasted from the base station AP1, and that upon receiving a frame unicasted from the base station AP1. If it is determined that the directive beam control is done, the base station AP2 may further check if the degree of focus of directionality is enough to implement SDMA. If it is determined that the base station AP1 executes directive beam control (with the degree of focus of directionality which is enough to implement SDMA), the base station AP2 increases the carrier sense level of the self apparatus (to minimize the carrier sense sensitivity). In this way, since the base station AP2 minimizes the carrier sense sensitivity, it detects less frequently radio waves that the base station AP1 transmits in communications with the terminals STA11 and STA12 in the first BSS or with another base station. Therefore, when the base station AP2 determines that no communication partner of the base station AP1 is present, it does not set the NAV (Network Allocation Vector) specified by IEEE802.11 (if the NAV is set, the base station AP2 waits access to the base station AP1 for a period of time designated by the NAV). Hence, the base station AP2 can start transmission of frames to the base station AP1.

Also, the base station AP2 may check if the base station AP1 executes directive beam control, on the basis of received power upon receiving a frame broadcasted from the base station AP1 and transmitting power information of that received frame, and received power upon receiving frame unicasted from the base station AP1 and transmitting power information of that received frame. If it is determined that the directive beam control is done, the base station AP2 may further check if the degree of focus of directionality is enough to implement SDMA. If it is determined that the base station AP1 executes directive beam control (with the degree of focus of directionality which is enough to implement SDMA), the base station AP2 increases the carrier sense level of the self apparatus (to minimize the carrier sense sensitivity). In this way, since the base station AP2 minimizes the carrier sense sensitivity, it detects less frequently radio waves that the base station AP1 transmits in communications with the terminals STA11 and STA12 in the first BSS or with another base station. Therefore, when the base station AP2 determines that no communication partner of the base station AP1 is present, it does not set the NAV (Network Allocation Vector) specified by IEEE802.11 (if the NAV is set, the base station AP2 waits access to the base station AP1 for a period of time designated by the NAV). Hence, the base station AP2 can start transmission of frames to the base station AP1.

Note that the base station AP2 may have both the carrier sense control unit 109 and transmitter power control unit 106 to control both the carrier sense level and transmitting power, as shown in FIG. 24, or may control one of the carrier sense level and transmitting power. Either case does not depart from the scope of the gist of the present invention.

The base station AP2 may have one of the carrier sense control unit 109 and transmitter power control unit 106.

SIXTH EMBODIMENT

IEEE802.11 specifies an access control method, i.e., RTS/CTS. In this method, the right of transmission is assured using a control frame of a MAC frame shown in FIG. 6. Note that RTS/CTS control uses RTS and CTS frames, and an RTS or CTS frame can be identified by "type" and "subtype" in frame control in the MAC header.

This RTS/CTS control method can be applied to the wireless communication system of FIG. 15. In such case, when the base station AP1 receives an RTS frame from the base station AP2, a CTS frame that the base station AP1 returns to the base station AP2 as a response to the RTS frame is transmitted using a directive beam set toward the base station AP2. In consideration of this point, as in the fourth and fifth embodiments, the base station AP2 controls the transmitting power and/or carrier sense level on the basis of the transmitting power information and received power of a received beacon frame, and those of the received CTS frame. Or alternatively, the base station AP2 controls the transmitting power and/or carrier sense level on the basis of received power of a received beacon frame, and that of the received CTS frame.

Since other arrangements are substantially the same as those in the fourth and fifth embodiments described above, the sixth embodiment will be briefly explained below.

Upon generation of a transmission request, the base station AP2 transmits an RTS frame to the base station AP1. In such case, if transmitting power, which was set by the transmitter power control unit 106 previously upon transmitting frame to the base station AP1, is available, the RTS frame is transmitted using that transmitting power. Otherwise, that frame may be transmitted with default transmitting power.

Upon receiving the RTS frame, the base station AP1 sets a directive beam to be directed to the base station Ap2 on the basis of the received power at that time and the like. That is, the base station AP1 sets the aforementioned weighting factors corresponding to a direction in which the base station AP2 is present.

The base station AP1 transmits a CTS frame to the base station AP2 using the set directive beam. This CTS frame may contain transmitting power information, as described above.

If the received frame type detection unit 103 determines that frame received via the antenna is a CTS frame, the beam gain estimating unit 105 receives the received power of that frame measured by the received power measuring unit 102, and transmitting power information, which is extracted from that frame or is pre-stored in correspondence with the CTS frame, from the transmitted power detection unit 104.

At this time, the beam gain estimating unit 105 and transmitter power control unit 106 execute the processes shown in FIG. 21 using the received power and transmitting power information of the CTS frame and those of received beacon frame obtained in step S102 in FIG. 20, so as to set the transmitting power.

Or the processes shown in FIG. 25 are executed to set the carrier sense level.

Or the transmitting power and carrier sense level may be set at the same time.

In such case, the beam gain estimating unit 105 may receive only the received power of the frame measured by the received power measuring unit 102, and may set the transmitting power based on the received power.

In the above description, the base station AP2 transmits an RTS frame to the base station AP1. Also, in some cases, the base station AP1 transmits an RTS frame to the base station AP2.

A case will be explained below wherein the base station AP1 transmits an RTS frame to the base station AP2.

In such case, if the base station AP1 already received frame transmitted from the base station AP2 as a communication partner previously, it sets a directive beam toward the base station AP2 based on the received power at that time and the like, and transmits the RTS frame.

Hence, in consideration of this point, the base station AP2 may control the transmitting power and/or carrier sense level on the basis of the transmitting power information and received power of the received beacon frame and those of the received RTS frame, as in the fourth and fifth embodiments.

That is, if the received frame type detection unit 103 determines that frame received via the antenna 20, directional antenna 2, or adaptive array antenna 25 is an RTS frame, the beam gain estimating unit 105 receives the received power of that frame measured by the received power measuring unit 102, and transmitting power information, which is extracted from that frame or is pre-stored in correspondence with the RTS frame, from the transmitted power detection unit 104.

At this time, the beam gain estimating unit 105 and transmitter power control unit 106 execute the processes shown in FIG. 21 using the received power and transmitting power information of the RTS frame and those of received beacon frame obtained in step S102 in FIG. 20, so as to set the transmitting power.

At the same time or in place of setting the transmitting power, the processes shown in FIG. 25 may be executed to set the carrier sense level.

In such cases, the beam gain estimating unit 105 and transmitter power control unit 106 may set the transmitting power using only the received power measured upon receiving a beacon frame.

When the base station has executed the transmitter power control to set new transmitting power, it transmits a CTS frame to the base station AP1 using the set transmitting power.

Upon receiving the CTS frame, the base station AP1 re-sets a directive beam toward the base station AP2 on the basis of the received power at that time and the like, and uses that beam in subsequent communications with the base station AP2.

In this manner, the sixth embodiment can obtain the same effects as in the fourth and fifth embodiments.

In the fourth to sixth embodiments, the base station AP2 can receive beacon frames in any of the reception mode (step S2), authentication (step S4), association (step S5), communications (step S6), disassociation (step S8), and deauthentication (step S9) in FIG. 19 in principle. Hence, if the base station AP2 receives a frame addressed (unicasted) to the self apparatus after it receives a beacon frame, it can execute transmitter power control and carrier sense level control shown in FIGS. 21 and 25 anytime.

In the first to fifth embodiments, communication between two base stations have been explained. Also, three or more base stations can be connected wirelessly using the above method. Especially, when each base station has a directional antenna, a plurality of base stations can be connected not only in series but in a tree-, ring-, and mesh-patterns.

In this way, not only one but also a plurality of new base stations to be connected wirelessly can be set, and prompt actions can be taken on broadening the communication area, and on an improvement of communication quality with a terminal apparatus in a very bad wireless communication environment.

The first to sixth embodiments can be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless communication apparatus which is one of a plurality of wireless communication apparatuses, each having a relay function, the wireless communication apparatus comprising:

a unit configured to insert a data item into one or more fields which are included in at least one of an authentication frame used in an authentication process with respect to another of the wireless communication apparatuses and an association frame used in an association process with respect to the another of the wireless communication apparatuses, the data item in the one or more fields included in the one of the authentication frame and the association frame designating that the one of the authentication frame and the association frame is transmitted from one of the wireless communication apparatuses;

a transmitter unit configured to transmit the one of the authentication frame and the association frame in which the data item is inserted;

a receiver unit configured to receive frames which are transmitted from the another of the wireless communication apparatuses, to obtain received frames;

a measuring unit configured to measure a received power of each of the received frames, to obtain measured powers;

a detection unit configured to detect a type of each of the received frames, to obtain detected types;

a determination unit configured to determine whether the another of the wireless communication apparatuses is adapted to form a directional pattern having directivity toward the wireless communication apparatus or not when the another of the wireless communication apparatuses is adapted to transmit the frames which are addressed to the wireless communication apparatus, based on the measured powers and the detected types; and a controlling unit configured to suppress, when the determination unit determines that the another of the wireless communication apparatuses is adapted to form the directional pattern having directivity toward the wireless communication apparatus, at least one of (a) a transmitting power of transmitting frame addressed to the another of the wireless communication apparatuses and (b) a sensitivity of sensing carrier.

2. The wireless communication apparatus according to claim 1, further comprising:

a synchronization unit configured to synchronize a frame transmission timing of the wireless communication apparatus with that of the another of the wireless communication apparatuses, responsive to the another of wireless communication apparatuses broadcasting synchronization signals.

3. The wireless communication apparatus according to claim 1, further comprising:

a receiver unit configured to receive a first frame which is not addressed to the wireless communication apparatus; and a transmission controlling unit configured to control an operation for transmitting frames with respect to the another of the wireless communication apparatuses and frames with respect to terminal apparatuses connecting to the wireless communication apparatus, when the first frame satisfies a predetermined condition, the condition being that the first frame is transmitted from one of the terminal apparatuses and is addressed to another of the terminal apparatuses without being relayed by the wireless communication apparatus.

4. The wireless communication apparatus according to claim 3, wherein the transmission controlling unit controls the operation so as not to transmit the frames with respect to the another of the wireless communication apparatuses and the frames with respect to the terminal apparatuses for a predetermined time.

5. A terminal apparatus of a plurality of terminal apparatuses which are arranged to connect, in use, to the wireless communication apparatus according to claim 1, comprising:
a receiver unit configured to receive a frame which is not addressed to the terminal apparatus; and
a transmission controlling unit configured to control an operation for transmitting frames with respect to the wireless communication apparatus and the terminal apparatuses other than the terminal apparatus, when the frame received satisfies a predetermined condition, the condition being that the frame received is transmitted and is to be received among the wireless communication apparatus and the terminal apparatuses other than the terminal apparatus.

6. The terminal apparatus according to claim 5, wherein the transmission controlling unit controls the operation so as not to transmit the frames for a predetermined time.

7. The wireless communication apparatus according to claim 1, further comprising:
a first forming unit configured to form a directional pattern having directivity toward the another of the wireless communication apparatuses, for transmitting the authentication frame and the association frame.

8. The wireless communication apparatus according to claim 1, further comprising:
a second forming unit configured to form an omni-directional pattern, for transmitting and receiving frames with respect to terminal apparatuses connecting to the wireless communication apparatus.

9. The wireless communication apparatus according to claim 1, wherein the authentication frame and the association frame are management frames of MAC specified by IEEE802.11, and the data item is inserted in at least one of a "To DS" field and a "From DS" field.

10. The wireless communication apparatus according to claim 1, wherein the authentication frame and the association frame are management frames of MAC specified by IEEE802.11, and the data item is inserted in a "capability information" field.

11. The wireless communication apparatus according to claim 1, wherein the one or more fields are used neither in the authentication and the association processes between the wireless communication apparatuses and terminal apparatuses connecting to the wireless communication apparatuses nor in the authentication and the association processes among the terminal apparatuses.

12. A wireless communication apparatus which is one of a plurality of wireless communication apparatuses, each having a relay function, the wireless communication apparatus comprising:
a unit configured to insert a data item into one or more fields which are included in at least one of an authentication frame used in an authentication process with respect to another of the wireless communication apparatuses and an association frame used in an association process with respect to the another of the wireless communication apparatuses, the data item in the one or more fields included in the one of the authentication frame and the association frame designating that the one of the authentication frame and the association frame is transmitted from one of the wireless communication apparatuses;
a transmitter unit configured to transmit the one of the authentication frame and the association frame in which the data item is inserted;
a receiver unit configured to receive frames which are transmitted from the another of the wireless communication apparatuses, to obtain received frames;
a measuring unit configured to measure received power of each of the received frames, to obtain measured powers;
a first detection unit configured to detect a type of each of the received frames, to obtain detected types;
a second detection unit configured to detect a transmitting power used by the another of the wireless communication apparatuses for transmitting each of the received frames, to obtain a detected powers;
a determination unit configured to determine whether the another of the wireless communication apparatuses is adapted to form a directional pattern having directivity toward the wireless communication apparatus or not when the another of the wireless communication apparatuses is adapted to transmit the frames which are addressed to the wireless communication apparatus, based on the measured powers, the detected types, and the detected powers; and
a controlling unit configured to suppress, when the determination unit determines that the another of the wireless communication apparatuses is adapted to form the directional pattern having directivity toward the wireless communication apparatus, at least one of (a) a transmitting power of transmitting frame addressed to the another of the wireless communication apparatuses and (b) a sensitivity of sensing carrier.

13. The wireless communication apparatus according to claim 12, further comprising:
a synchronization unit configured to synchronize a frame transmission timing of the wireless communication apparatus with that of the another of the wireless communication apparatuses, responsive to the another of wireless communication apparatuses broadcasting synchronization signals.

14. The wireless communication apparatus according to claim 12, further comprising:
a receiver unit configured to receive a first frame which is not addressed to the wireless communication apparatus; and
a transmission controlling unit configured to control an operation for transmitting frames with respect to the another of the wireless communication apparatuses and frames with respect to terminal apparatuses connecting to the wireless communication apparatus, when the first frame satisfies a predetermined condition, the condition being that the first frame is transmitted from one of the terminal apparatuses and is addressed to another of the terminal apparatuses without being relayed by the wireless communication apparatus.

15. The wireless communication apparatus according to claim 14, wherein the transmission controlling unit controls the operation so as not to transmit the frames with respect to the another of the wireless communication apparatuses and the frames with respect to the terminal apparatuses for a predetermined time.

16. A terminal apparatus of a plurality of terminal apparatuses which are arranged to connect, in use, to the wireless communication apparatus according to claim 12, comprising:
a receiver unit configured to receive a frame which is not addressed to the terminal apparatus; and a transmission controlling unit configured to control an operation for transmitting frames with respect to the wireless communication apparatus and the terminal apparatuses other than the terminal apparatus, when the frame received satisfies a predetermined condition, the condition being that the frame received is transmitted and is to be received among the wireless communication apparatus and the terminal apparatuses other than the terminal apparatus.

17. The terminal apparatus according to claim 16, wherein the transmission controlling unit controls the operation so as not to transmit the frames for a predetermined time.

18. The wireless communication apparatus according to claim 12, further comprising:
a first forming unit configured to form a directional pattern having directivity toward the another of the wireless communication apparatuses, for transmitting the authentication frame and the association frame.

19. The wireless communication apparatus according to claim 12, further comprising:
a second forming unit configured to form an omni-directional pattern, for transmitting and receiving frames with respect to terminal apparatuses connecting to the wireless communication apparatus.

20. The wireless communication apparatus according to claim 12, wherein the authentication frame and the association frame are management frames of MAC specified by IEEE802.11, and the data item is inserted in at least one of a "To DS" field and a "From DS" field.

21. The wireless communication apparatus according to claim 12, wherein the authentication frame and the association frame are management frames of MAC specified by IEEE802.11, and the data item is inserted in a "capability information" field.

22. The wireless communication apparatus according to claim 12, wherein the one or more fields are used neither in the authentication and the association processes between the wireless communication apparatuses and terminal apparatuses connecting to the wireless communication apparatuses nor in the authentication and the association processes among the terminal apparatuses.

23. A wireless communication apparatus which is one of a plurality of wireless communication apparatuses, each having a relay function, the wireless communication apparatus comprising:
a unit configured to insert a data item into one or more fields which are included in at least one of an authentication frame used in an authentication process with respect to another of the wireless communication apparatuses and an association frame used in an association process with respect to the another of the wireless communication apparatuses, the data item in the one or more fields included in the one of the authentication frame and the association frame designating that the one of the authentication frame and the association frame is transmitted from one of the wireless communication apparatuses;
a transmitter unit configured to transmit the one of the authentication frame and the association frame in which the data item is inserted;
a receiver unit configured to receive a broadcast frame transmitted from the another of the wireless communication apparatuses;
a measuring unit configured to measure a received power of the broadcast frame when it is received, to obtain a first measured power;
a receiver unit configured to receive a unicast frame transmitted from the another of the wireless communication apparatuses to the wireless communication apparatus;
a measuring unit configured to measure a received power of the unicast frame when it is received, to obtain a second measured power;
a determination unit configured to determine whether the another of the wireless communication apparatuses is adapted to form a directional pattern having directivity toward the wireless communication apparatus or not when the another of the wireless communication apparatuses is adapted to transmit the unicast frame to the wireless communication apparatus, based on the first and the second measured power; and
a controlling unit configured to suppress, when the determination unit determines that the another of the wireless communication apparatuses is adapted to form the directional pattern having directivity toward the wireless communication apparatus, at least one of (a) a transmitting power of transmitting frame addressed to the another of the wireless communication apparatuses and (b) a sensitivity of sensing carrier.

24. The wireless communication apparatus according to claim 23, further comprising:
a synchronization unit configured to synchronize a frame transmission timing of the wireless communication apparatus with that of the another of the wireless communication apparatuses, responsive to the another of wireless communication apparatuses broadcasting synchronization signals.

25. The wireless communication apparatus according to claim 23, further comprising:
a receiver unit configured to receive a first frame which is not addressed to the wireless communication apparatus; and
a transmission controlling unit configured to control an operation for transmitting frames with respect to the another of the wireless communication apparatuses and frames with respect to terminal apparatuses connecting to the wireless communication apparatus, when the first frame satisfies a predetermined condition, the condition being that the first frame is transmitted from one of the terminal apparatuses and is addressed to another of the terminal apparatuses without being relayed by the wireless communication apparatus.

26. The wireless communication apparatus according to claim 25, wherein the transmission controlling unit controls the operation so as not to transmit the frames with respect to the another of the wireless communication apparatuses and the frames with respect to the terminal apparatuses for a predetermined time.

27. A terminal apparatus of a plurality of terminal apparatuses which are arranged to connect, in use, to the wireless communication apparatus according to claim 23, comprising:
a receiver unit configured to receive a frame which is not addressed to the terminal apparatus; and
a transmission controlling unit configured to control an operation for transmitting frames with respect to the wireless communication apparatus and the terminal apparatuses other than the terminal apparatus, when the frame received satisfies a predetermined condition, the condition being that the frame received is transmitted and is to be received among the wireless communication apparatus and the terminal apparatuses other than the terminal apparatus.

28. The terminal apparatus according to claim 27, wherein the transmission controlling unit controls the operation so as not to transmit the frames for a predetermined time.

29. The wireless communication apparatus according to claim 23, further comprising:
a first forming unit configured to form a directional pattern having directivity toward the another of the wireless communication apparatuses, for transmitting the authentication frame and the association frame.

30. The wireless communication apparatus according to claim 23, further comprising:
a second forming unit configured to form an omni-directional pattern, for transmitting and receiving frames with respect to terminal apparatuses connecting to the wireless communication apparatus.

31. The wireless communication apparatus according to claim 23, wherein the authentication frame and the association frame are management frames of MAC specified by IEEE802.11, and the data item is inserted in at least one of a "To DS" field and a "From DS" field.

32. The wireless communication apparatus according to claim 23, wherein the authentication frame and the association frame are management frames of MAC specified by IEEE802.11, and the data item is inserted in a "capability information" field.

33. The wireless communication apparatus according to claim 23, wherein the one or more fields are used neither in the authentication and the association processes between the wireless communication apparatuses and terminal apparatuses connecting to the wireless communication apparatuses nor in the authentication and the association processes among the terminal apparatuses.

34. A wireless communication apparatus which is one of a plurality of wireless communication apparatuses, each having a relay function, the wireless communication apparatus comprising:
a unit configured to insert a data item into one or more fields which are included in at least one of an authentication frame used in an authentication process with respect to another of the wireless communication apparatuses and an association frame used in an association process with respect to the another of the wireless communication apparatuses, the data item in the one or more fields included in the one of the authentication frame and the association frame designating that the one of the authentication frame and the association frame is transmitted from one of the wireless communication apparatuses;
a transmitter unit configured to transmit the one of the authentication frame and the association frame in which the data item is inserted;
a receiver unit configured to receive a broadcast frame transmitted from the another of the wireless communication apparatuses;
a measuring unit configured to measure a received power of the broadcast frame when it is received, to obtain a first measured power;
a detection unit configured to detect a transmitting power used by the another of the wireless communication apparatuses for transmitting the broadcast frame, to obtain a first detected power;
a receiver unit configured to receive a unicast frame transmitted from the another of the wireless communication apparatuses to the wireless communication apparatus;
a measuring unit configured to measure a received power of the unicast frame when it is received, to obtain a second measured power;
a detection unit configured to detect a transmitting power used by the another of the wireless communication apparatuses for transmitting the unicast frame, to obtain a second detected power;
a determination unit configured to determine whether the another of the wireless communication apparatuses is adapted to form a directional pattern having directivity toward the wireless communication apparatus or not when the another of the wireless communication apparatuses is adapted to transmit the unicast frame to the wireless communication apparatus, based on the first and the second measured powers and the first and the second detected powers; and
a controlling unit configured to suppress, when the determination unit determines that the another of the wireless communication apparatuses is adapted to form the directional pattern having directivity toward the wireless communication apparatus, at least one of (a) a transmitting power of transmitting frame addressed to the another of the wireless communication apparatuses and (b) a sensitivity of sensing carrier.

35. The wireless communication apparatus according to claim 34, further comprising:
a synchronization unit configured to synchronize a frame transmission timing of the wireless communication apparatus with that of the another of the wireless communication apparatuses, responsive to the another of wireless communication apparatuses broadcasting synchronization signals.

36. The wireless communication apparatus according to claim 34, further comprising:
a receiver unit configured to receive a first frame which is not addressed to the wireless communication apparatus; and
a transmission controlling unit configured to control an operation for transmitting frames with respect to the another of the wireless communication apparatuses and frames with respect to terminal apparatuses connecting to the wireless communication apparatus, when the first frame satisfies a predetermined condition, the condition being that the first frame is transmitted from one of the terminal apparatuses and is addressed to another of the terminal apparatuses without being relayed by the wireless communication apparatus.

37. A terminal apparatus of a plurality of terminal apparatuses which are arranged to connect, in use, to the wireless communication apparatus according to claim 34, comprising:
a receiver unit configured to receive a frame which is not addressed to the terminal apparatus; and
a transmission controlling unit configured to control an operation for transmitting frames with respect to the wireless communication apparatus and the terminal apparatuses other than the terminal apparatus, when the frame received satisfies a predetermined condition, the condition being that the frame received is transmitted and is to be received among the wireless communication apparatus and the terminal apparatuses other than the terminal apparatus.

38. The wireless communication apparatus according to claim 34, further comprising:
a first forming unit configured to form a directional pattern having directivity toward the another of the wireless communication apparatuses, for transmitting the authentication frame and the association frame.

39. The wireless communication apparatus according to claim 34, further comprising:
   a second forming unit configured to form an omni-directional pattern, for transmitting and receiving frames with respect to terminal apparatuses connecting to the wireless communication apparatus.

40. The wireless communication apparatus according to claim 36, wherein the transmission controlling unit controls the operation so as not to transmit the frames with respect to the another of the wireless communication apparatuses and the frames with respect to the terminal apparatuses for a predetermined time.

41. The terminal apparatus according to claim 37, wherein the transmission controlling unit controls the operation so as not to transmit the frames for a predetermined time.

42. The wireless communication apparatus according to claim 34, wherein the authentication frame and the association frame are management frames of MAC specified by IEEE802.11, and the data item is inserted in at least one of a "To DS" field and a "From DS" field.

43. The wireless communication apparatus according to claim 34, wherein the authentication frame and the association frame are management frames of MAC specified by IEEE802.11, and the data item is inserted in a "capability information" field.

44. The wireless communication apparatus according to claim 34, wherein the one or more fields are used neither in the authentication and the association processes between the wireless communication apparatuses and terminal apparatuses connecting to the wireless communication apparatuses nor in the authentication and the association processes among the terminal apparatuses.

* * * * *